United States Patent [19]

Aoki et al.

[11] 4,410,258
[45] Oct. 18, 1983

[54] AUTOMATIC FOCUS DETECTING DEVICE FOR CAMERA

[75] Inventors: Harumi Aoki; Masahiro Kawasaki, both of Saitama; Koji Suzuki, Asaka, all of Japan

[73] Assignee: Asahi Kogaku Kogyo Kabushiki Kaisha, Tokyo, Japan

[21] Appl. No.: 290,415

[22] Filed: Aug. 6, 1981

[30] Foreign Application Priority Data

Aug. 7, 1980 [JP] Japan .................................. 55-108611
Aug. 19, 1980 [JP] Japan .................................. 55-113063
Sep. 4, 1980 [JP] Japan .................................. 55-121761
Oct. 9, 1980 [JP] Japan .................................. 55-140605

[51] Int. Cl.³ .............................................. G03B 7/08
[52] U.S. Cl. ........................................ 354/25; 354/31
[58] Field of Search ...................... 354/25 R, 31 F

[56] References Cited

U.S. PATENT DOCUMENTS

| 3,896,304 | 7/1975 | Aoki et al. |
|---|---|---|
| 4,053,240 | 10/1977 | Aizawa et al. ................. 354/25 |
| 4,220,850 | 9/1980 | McEachern ................... 354/25 |
| 4,255,028 | 3/1981 | Aoki . |
| 4,264,160 | 4/1981 | Aoki . |
| 4,264,810 | 4/1981 | Utagawa et al. ............... 354/25 |
| 4,298,259 | 11/1981 | Aoki et al. . |
| 4,311,904 | 1/1982 | Okada et al. .................. 354/25 |
| 4,314,151 | 2/1982 | Suzuki et al. .................. 354/25 |
| 4,320,946 | 3/1982 | Aoki et al. ..................... 354/25 |

Primary Examiner—Russell E. Adams
Attorney, Agent, or Firm—Fleit, Jacobson & Cohn

[57] ABSTRACT

An automatic focus detecting device for a camera comprises a lens system having an image plane for focusing light transmitted along a light path, at least one self-scanning type photoelectric converting device including a plurality of charged storage type microphotoelectric elements disposed in a microphotoelectric element row at a position corresponding to the image plane of the lens system, and a scanning circuit for the microphotoelectric element row for detecting the state of focus of the image of the object to generate a photoelectric output, and at least one light detector for monitoring the incident light and including a charge storage type photoelectric element provided near and in the same plane as the microphotoelectric element row for storing a quantity of charge in correspondence to the quantity of incident light, the self-scanning type photoelectric converting device having a charge storage time which is controlled according to the quantity of charge stored in the light detector in correspondence to the quantity of incident features. Further features of the invention include the provision of a contrast detecting circuit for providing peak values of photoelectric output differences between two of the microphotoelectric elements, and a focus judging circuit for providing a focus indication signal when the absolute value of the difference between the two contrast signals is lower than a predetermined focus detection threshold level. Still further features of the invention include the provision of a focus effective region judging circuit, a focus indication circuit, a light splitter, and a contrast compensation circuit.

18 Claims, 44 Drawing Figures

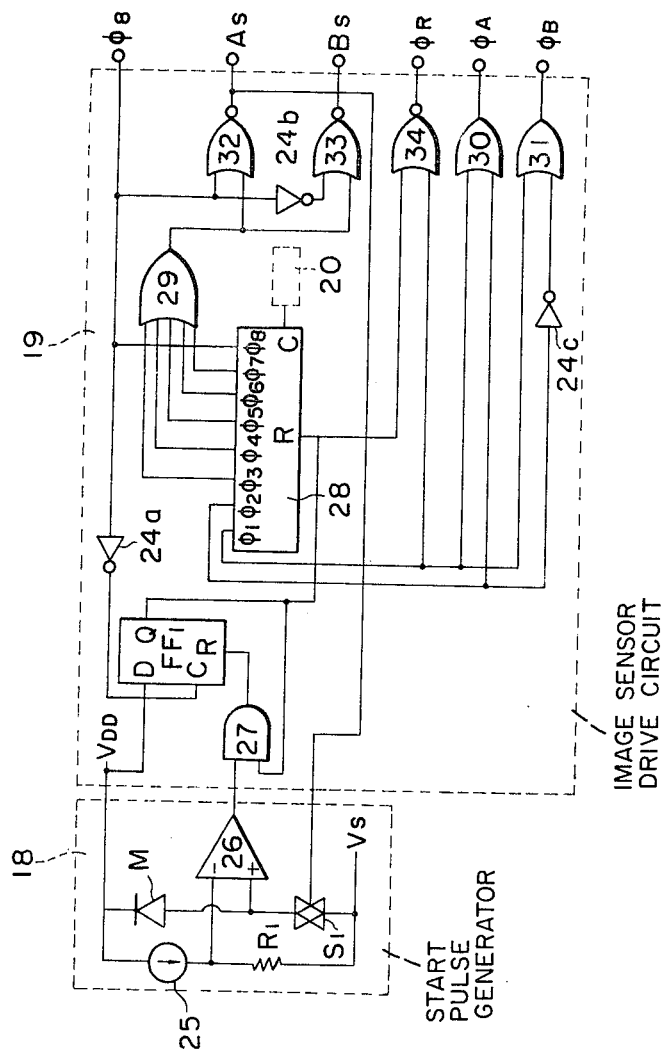
F I G. 10

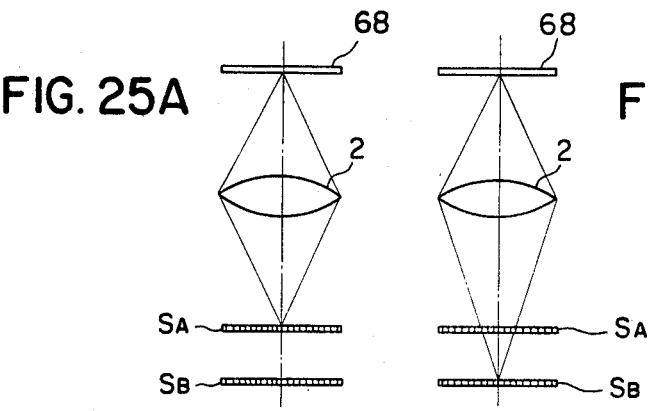
FIG. 25A  FIG. 25B
FIG. 25C
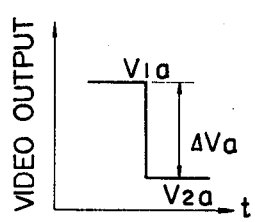
FIG. 25D
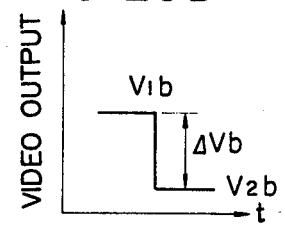
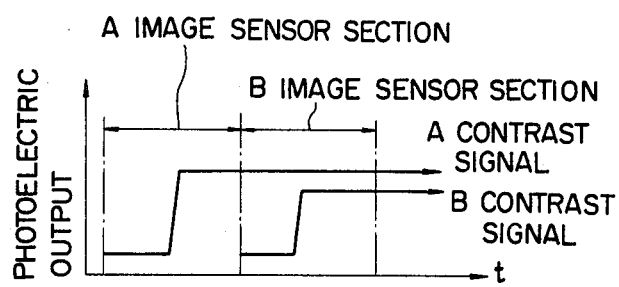
FIG. 25E FIG. 26B
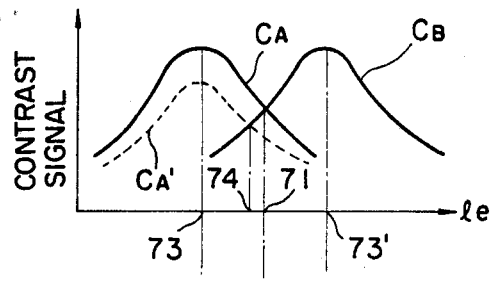
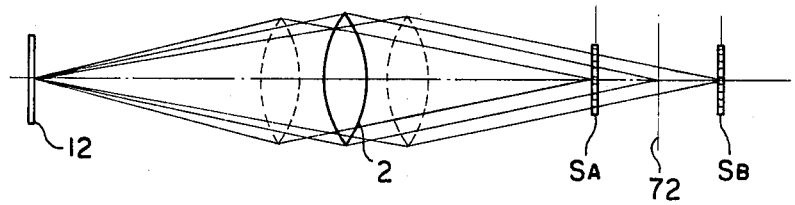
FIG. 26A
FIG. 27
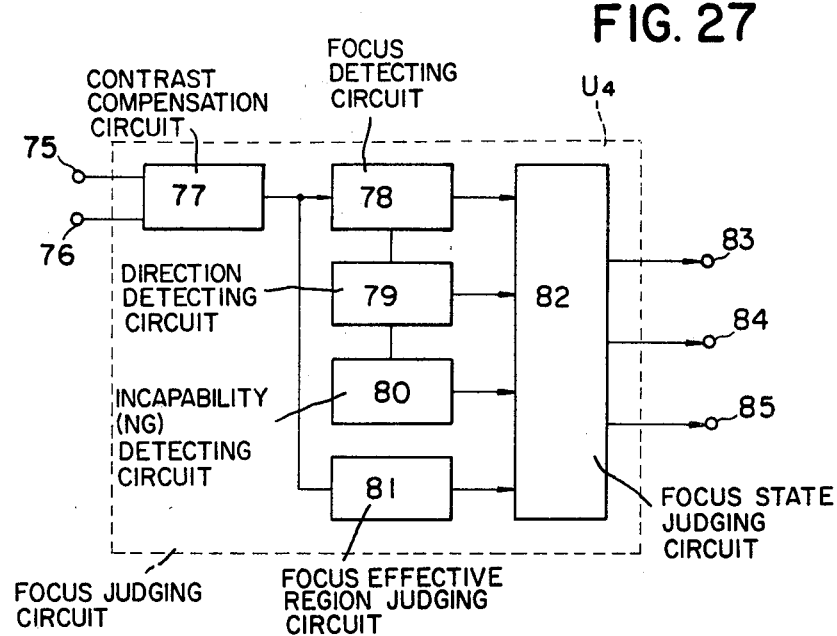

F I G. 38
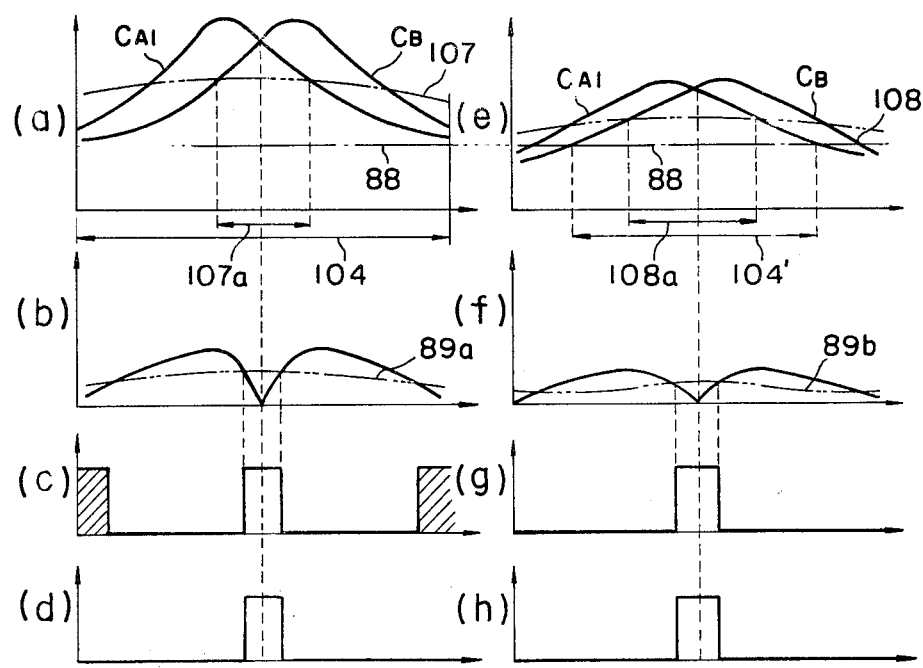

FOCUS STATE JUDGING CIRCUIT

AUTOMATIC FOCUS DETECTING DEVICE FOR CAMERA

BACKGROUND OF THE INVENTION

1. Field of the Invention

This invention relates to an automatic camera focus detecting device for automatically detecting the camera focus by making use of the changing contrast of the image of the object.

2. Description of Prior Art

The optical image of an object focused by the photographing lens has a characteristic such that the brightness and darkness of the image, i.e., the contrast thereof, is maximum when the image is precisely focused. This phenomenon can be explained by the fact that the light intensity (power spectrum) of the image of the object at each spacial frequency is maximum when the image is precisely focused. Thus, the focus can be automatically detected from the detection of the maximum contrast.

The hitherto proposed methods for extracting the contrast information itself include one method which uses nonlinear photoconductive elements such as CdS, and one difference between the photoelectric outputs of a pair of microphotoelectric elements adjacent to each other selected from a number of such elements arranged on the image forming plane is statically detected, or another method which uses a self-scanning type photoelectric converting device including a plurality of microphotoelectric elements arranged in a single row and a scanning circuit for the microphotoelectric element group for dynamically obtaining a contrast signal from the photoelectric outputs of the microphotoelectric elements, as disclosed in Japanese Utility Model Publication No. 95830/78 corresponding to U.S. Pat. No. 3,896,304, Japanese Patent Publication No. 29878/1980 corresponding to U.S. Pat. No. 4,255,028 and Japanese Patent Publication No. 35317/1980 corresponding to U.S. Pat. No. 4,298,254 by the same applicant as the instant application.

The state of focus can be detected by using the above contrast detecting elements in various methods. In one example of the method, the maximum value state of a contrast signal is detected with a single contrast detecting element disposed at a position equivalent to the image plane. In another example, a single contrast detecting element is mechanically oscillated on the optical axis back and forth in a plane equivalent to the image plane for analyzing the changes of the contrast output in the oscillation period, as disclosed in, for instance, Japanese Patent Publication No. 29832/1980 corresponding to U.S. Pat. No. 4,264,160 and Japanese Utility Model Publication No. 95830/1978 Corresponding to U.S. Pat. No. 3,896,304. In a further example, two contrast detecting elements in respective positions before and after and at an equal distance from a position which is equivalent to the image plane, and the state in which the contrast signal outputs from both these contrast detecting elements are equal is detected, as disclosed in, for instance, Japanese Patent Application No. 15257/1979.

These automatic focus detecting systems which make use of the contrast information of the image of the object are suited for assembly as a commonly termed TTL focus detecting device in an automatic focus detecting device of a single-lens reflex camera.

Meanwhile, the single-lens reflex camera or like high class camera, which is capable of replacement of lens, covers a wide range of the photographing distance. Also, since it uses a high performance lens, a sharp image can be obtained, and the brightness of the object that can be photographed is wide.

Therefore, the automatic focus detecting device has to meet various stringent conditions if it is to be used for the single-lens reflex camera as mentioned. More particularly, it is required to cover a wide range of the brightness of the object, to have high precision of focus, to be capable of application even where a swing is present or the object is being moved, and to be applicable for use various lenses that can be replaced with one another. However, these conditions have not always been satisfactorily met by the prior art devices or systems as mentioned.

Where the aforementioned two contrast detecting elements are arranged in their positions before and after a position equivalent to the image plane, frequent use has been made of a system of splitting the light path into two paths with a light path divider including a half reflection mirror, a total reflection mirror, etc. in order to provide a small-size and compact construction.

However, where such a light path divider is used, an unbalanced construction results from the provision of only a half reflection mirror in one of the two branch light paths and a half reflection mirror and a total reflection mirror in the other branch light path, that is, the two branch light paths have different light transmittances (i.e., ratios of the quantity of output light to the quantity of incident light). Therefore, despite the fact that two contrast detecting elements are used, the accuracy of the focus detection has not been sufficiently high.

SUMMARY OF THE INVENTION

The invention has been developed in light of the aforementioned various problems inherent in the prior art, and its object is to solve these problems by the provision of an automatic camera focus detecting device, which comprises a self-scanning type photoelectric converting device including a plurality of charge storage type microphotoelectric elements and a scanning circuit for the microphotoelectric element row for detecting the state of focus of the image of an object using the photoelectric output of the self-scanning type photoelectric converting device, and in which a light detector for monitoring, constituted by charge storage type photoelectric elements disposed near the microphotoelectric element row and in the same plane, is used to control the charge storage time of the self-scanning type photoelectric converting device according to the stored charge in the light detector corresponding to the quantity of incident light.

Another object of the invention is to solve the aforementioned problems by providing a device which comprises two self-scanning type photoelectric converting devices, provided at positions before and after and at an equal distance from a position equivalent to the image plane of a lens system, and each including a plurality of microphotoelectric elements and a scanning circuit for said microphotoelectric element row, a contrast detecting circuit for providing the peak values of photoelectric output differences between two microphotoelectric elements spaced apart a fixed distance in said individual self-scanning type photoelectric converting devices in one scanning period as two image sequential contrast signals corresponding to the magnitude of said lens extension, and a focus judging circuit for providing a focus indication signal when the absolute value of the difference between the two contrast signals is lower than a predetermined focus detection threshold level proportional to the sum of the two contrast signals.

A further object of the invention is to solve the above problems by providing a device which comprises two self-scanning type photoelectric converting devices, provided at positions before and after and at an equal distance from a position equivalent to the image plane of a lens system, and each including a plurality of microphotoelectric elements and a scanning circuit for the microphotoelectric element row, a contrast detecting circuit for providing the peak values of photoelectric output differences between two microphotoelectric elements spaced apart a fixed distance in the individual self-scanning type photoelectric converting devices in one scanning period as two time-sequential contrast signals corresponding to the magnitude of the lens extension, and a focus effective region judging circuit for comparing the levels of the two contrast signals with a predetermined focus effective region limiting level proportional to the peak of the sequential photoelectric signal, and in which a focus indication obtained from the two contrast signals is provided when the levels of the two contrast signals is simultaneously higher than a predetermined focus effective region limiting level.

A further object of the invention is to solve the above problems by providing a device which comprises two self-scanning type photoelectric converting devices, provided at positions before and after and at an equal distance from a position equivalent to the image plane of a lens system, and each including a plurality of microphotoelectric elements and a scanning circuit for said microphotoelectric element row for providing a sequential photoelectric signal corresponding to the light intensity distribution of the image of an object, a light splitter for splitting the incident light flux into two fluxes with a half mirror and projecting the resultant two light fluxes onto said self-scanning type photoelectric converting devices, a contrast detecting circuit for providing the peak values of photoelectric output differences between two microphotoelectric elements spaced apart a fixed distance in the individual self-scanning type photoelectric converting devices in one scanning period as two time-sequential contrast signals corresponding to the magnitude of said lens extension, and a contrast compensation circuit for compensating the two contrast signals for the out-of-balance condition therebetween due to the difference in the light transmittances between the light paths of the split light fluxes in the light splitter by increasing or reducing one of the two contrast signals with respect to the other, and in which the state of focus is detected from the two contrast signals after the compensation.

BRIEF DESCRIPTION OF THE DRAWINGS

Now, the present invention will be described with reference to the accompanying drawings, of which:

FIG. 10 is a schematic diagram of the start pulse generator and image sensor drive circuit of the present invention.

FIGS. 23, 24, 25(A)-(E), and 26(A)-(B) are further diagrams used to describe the method of detecting the state of focus from the contrast signals, in accordance with the invention.

FIG. 27 is a block diagram of the focus judging circuit $U_4$ of the present invention.

FIGS. 37 and 38(a)-(h) are diagrams illustrative of the operation of the focus effective region judging circuit 81 of the present invention.

DETAILED DESCRIPTION

Figure 1:
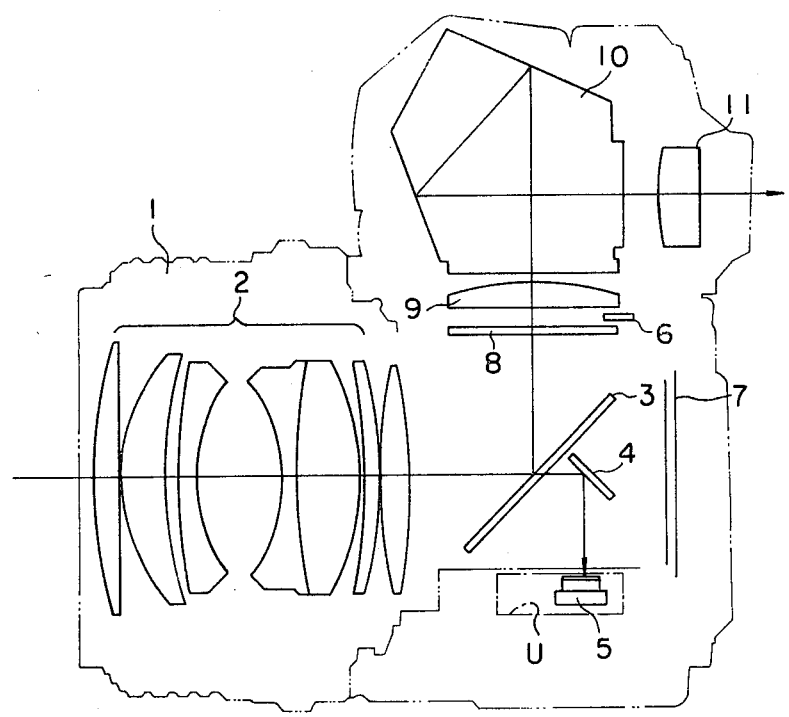
FIG. 1 is a diagrammatic representation of an embodiment of the present invention.

FIG. 1 shows an embodiment of the present invention applied to a single-lens reflect camera 1.

In FIG. 1, designated at 2 is a lens system, at 3 a half reflection mirror, at 4 a total reflection mirror, and a self-scanning type photoelectric converting device 5 which is provided on the light path of the automatic focus detecting device U according to the invention.

Designated at 6 are light-emitting diodes for displaying the state of focus to be described later. In the instant embodiment, three diodes (6a, 6b and 6c to be described later) are arranged in a direction normal to the plane of FIG. 1, and an observation window (not shown) is provided on the rear side of the camera 1.

Designated at 7 is a film, at 8 a focal point plate, at 9 a condenser lens, at 10 a pentaprism, and at 11 an eyepiece lens. At the time of the exposure of the film 7, the half reflection mirror 3 and total reflection mirror 4 are retreated from the light path by a half reflection drive mechanism (not shown).

Figure 2:
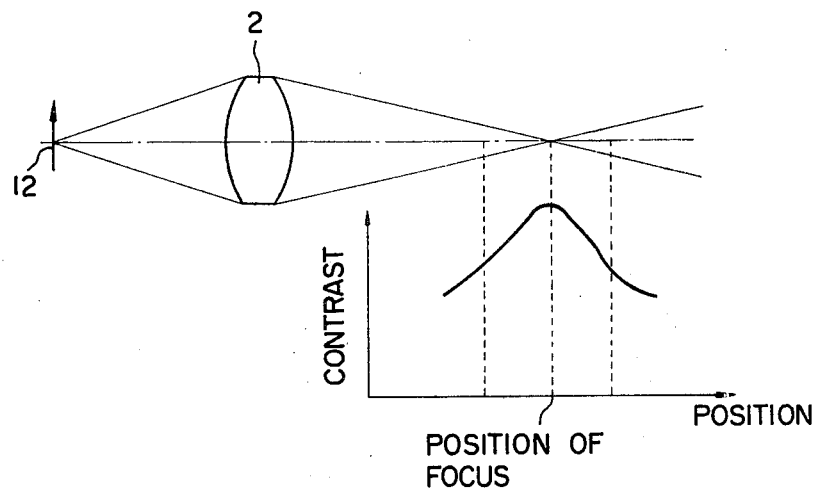
FIG. 2 is a diagrammatic representation of the general distribution of contrast of images of an object photographed in accordance with the present invention.

FIG. 2 shows the general distribution of contrast of the images of an object photographed by the camera mentioned above.

This curve of the contrast value of the image of the object 12 focused by the lens system 2 has a single peak corresponding to the position of focus. The focus detecting system uses contrast information which are roughly classed into two types, namely that making use of the fact that the contrast distribution curve has a peak, and that making use of the fact that the curve is symmetrical with respect to the peak. The present invention appertains to the latter type.

Figure 3:
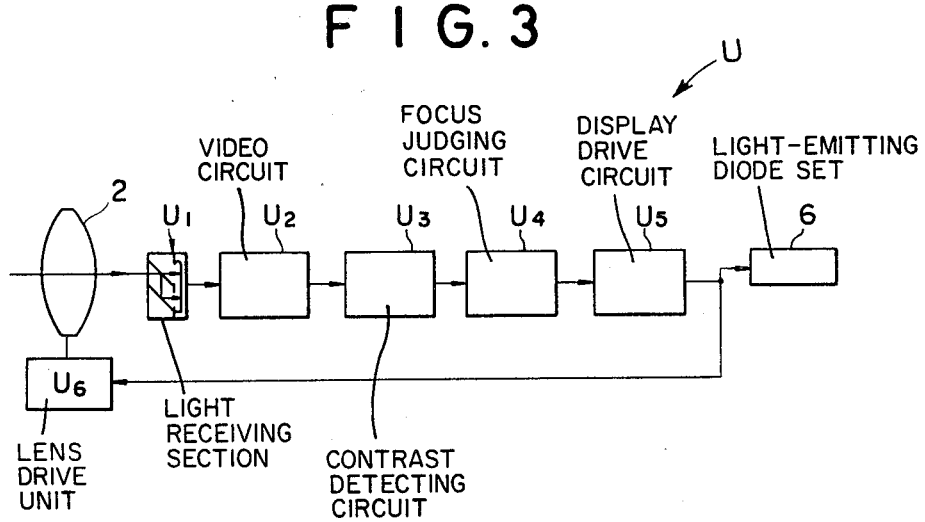
FIG. 3 is a block diagram of an automatic camera focus detecting device according to the invention.

FIG. 3 shows an example of the construction of the automatic camera focus detecting device U shown in FIG. 1.

The device comprises a light receiving section $U_1$ including the self-scanning type photoelectric converting device 5, a video circuit $U_2$, a contrast detecting circuit $U_3$, a focus judging circuit $U_4$ and a display drive circuit $U_5$. These parts are coupled together in the mentioned order. The output line from the display drive circuit $U_5$ is connected to a focus display element that is constituted by the aforementioned light-emitting diode set 6, and is also connected to a lens drive unit $U_6$. The lens drive unit $U_6$ includes by a lens drive motor.

When the light image of the object focused by the lens system 2 is incident on the self-scanning type photoelectric converting device 5, this device 5 drives the video circuit $U_2$, which thus provides a time division basis photoelectric conversion signal corresponding to the light intensity distribution of the image of the object (hereinafter referred to as video output). The contrast detecting circuit $U_3$ extracts from this video output the contrast value of object images incident on two image sensors (to be described later) in the photoelectric converting device 5 as a contrast signal. The focus judging circuit $U_4$ provides a focus indication signal indicating the state of focus according to the contrast signal output, and according to the focus indication signal the on-off control of the focus indicating element 6 through the display drive circuit $U_5$ and the control of the magnitude of the extension of the lens 2 by the lens drive unit $U_6$ are effected.

The individual component circuits in FIG. 3 will now be described in further detail.

Figure 4:
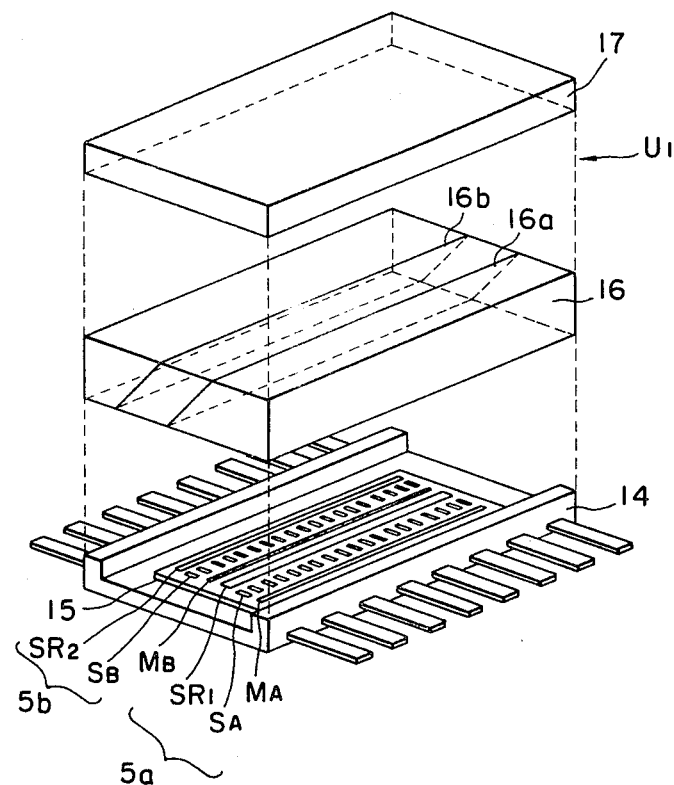
FIGS. 4 and 5 are diagrammatic representations of the light receiving section $U_1$.
Figure 5:
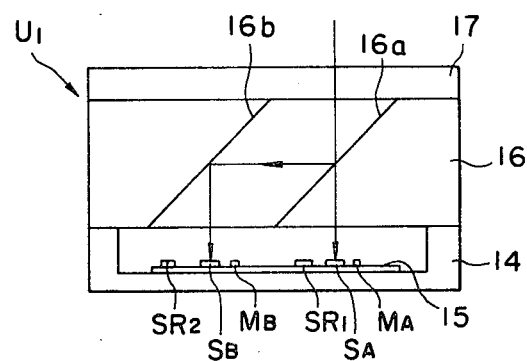

FIGS. 4 and 5 show an example of the construction of the light receiving section $U_1$.

The light receiving section $U_1$ includes a package sensor 14, a light splitter 16 and an infrared cutting filter 17, these parts being stacked one above another in the mentioned order.

The package sensor 14 includes a sensor IC chip 15, in which two self-scanning type photoelectric converting devices 5a and 5b and light sensors $M_A$ and $M_B$ for average light intensity detection (hereinafter referred to as A and B monitor sensors respectively) associated with the respective photoelectric converting devices 5a and 5b are integrally assembled together on the same plane.

The self-scanning type photoelectric converting devices 5a and 5b respectively include photoelectric element rows $S_A$ and $S_B$ (hereinafter referred to as A and B image sensors respectively) each constituted by a plurality of microphotoelectric elements and scanning circuits $SR_1$ and $SR_2$ constituted by shift registers for scanning the respective image sensors $S_A$ and $S_B$.

The image sensors $S_A$ and $S_B$ may use CCD (Charge-Coupled Device), BBD (Bucket-Brigade Device), MOS-FET, etc. These elements all have a signal charge storage function of storing in each cell the signal charge generated through the photoelectric conversion in addition to the function of the photoelectric converting function.

In the instant embodiment, the image sensors $S_A$ and $S_B$ are MOS-FET type image sensors. At one end of each of the image sensors $S_A$ and $S_B$, a mask sensor provided with a light blocking mask is disposed.

The monitor sensors $M_A$ and $M_B$, like the image sensors $S_A$ and $S_B$ described above, are constituted by photoelectric elements having a signal charge storage function. They are desirably disposed as close to the respective image sensors $S_A$ and $S_B$ as possible. In the illustrated example, two monitor sensors, one for each of the image sensors $S_A$ and $S_B$, are provided, and the monitor function is provided by the sum of the charge quantities stored in the two monitor sensors $M_A$ and $M_B$. However, it is not essential to provide two monitor sensors, and only a single monitor sensor may be provided as a common monitor to both the image sensors $S_A$ and $S_B$. However, since it is likely that the intensities of light incident upon the A and B image sensors $S_A$ and $S_B$ differ from each other, in the instant embodiment the two monitor sensors $M_A$ and $M_B$ are provided in the manner illustrated to use the total stored charge quantity for providing for a more effective monitoring function.

The image sensors $S_A$ and $S_B$ are constructed such that their charge storage times are inversely proportional to the quantity of incident light on both the monitor sensors $M_A$ and $M_B$ as will be described hereinafter.

In the light splitter 16, a half reflection mirror 16a for the A image sensor $S_A$ and a total reflection mirror 16b for the B image sensor $S_B$ are assembled. As shown in FIG. 5, light transmitted through the half reflection mirror 16a is incident on the A image sensor $S_A$ and A monitor sensor $M_A$, while light reflected by the half reflection mirror 16a is reflected by the total reflection mirror 16b to be incident on the B image sensor $S_B$ and B monitor sensor $M_B$. This arrangement is equivalent to the disposition of the A and B image sensors $S_A$ and $S_B$ on the optical axis and at positions spaced apart by a fixed distance. In other words, by disposing the light receiving section $U_1$ as a whole in a predetermined position, the A and B image sensors $S_A$ and $S_B$ can be located at positions before and after and at an equal distance from a plane equivalent to the film (a plane equivalent to the image plane of the lens system 2).

Since the light path through which light is transmitted through the half reflection mirror 16a and incident on the A image sensor $S_A$, and the other light path through which light is reflected by the half reflection mirror 16a and total reflection mirror 16b and incident on the B image sensor $S_B$, are subject to different light transmittances as mentioned previously, according to the invention, means for compensating for this is provided as will be described hereinafter.

The infrared cutting filter 17 serves to cut unnecessary infrared light in the case where the spectral sensitivities of the image sensors $S_A$ and $S_B$ and monitor sensors $M_A$ and $M_B$ cover even the infrared region, and it is not an essential part to the invention.

Figure 6:
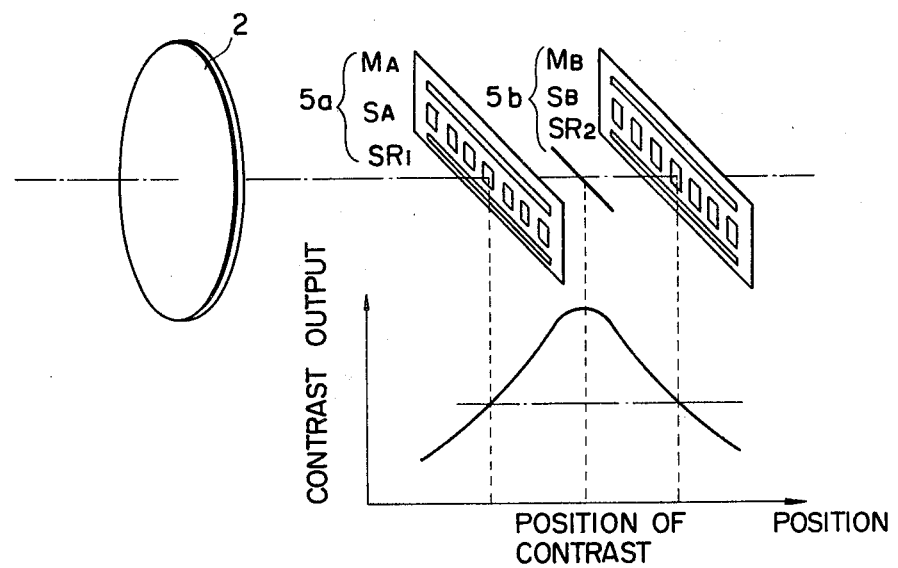
FIGS. 6 and 7A, 7B are diagrammatic and graphical illustrations describing the principles of focus detection according to the present invention.
Figures 7A, 7B:
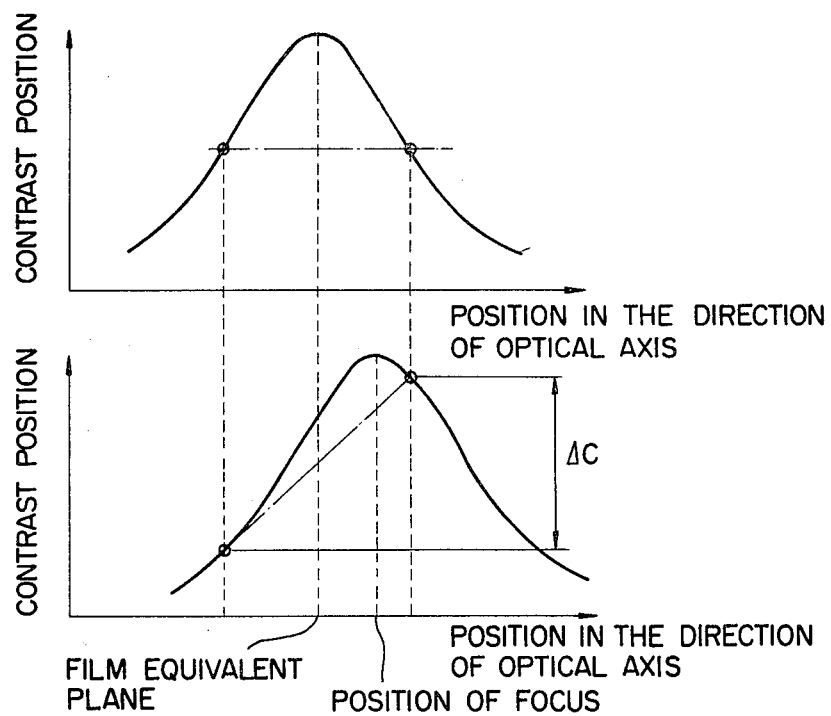

FIGS. 6 and 7(A) and (B) show the principles of the focus detection as implemented by the self-scanning type photoelectric converting devices 5a and 5b provided in the arrangement mentioned above. Since the A and B image sensors $S_A$ and $S_B$ are disposed at positions before and after and at an equal distance from a plane equivalent to the film, images spaced apart by a constant distance along the optical axis are incident on the image sensors $S_A$ and $S_B$. If the contrast of the image of the object has a symmetrical line distribution, the film equivalent plane and the position of focus coincide when the contrast values on the image sensors $S_A$ and $S_B$ are equal, as shown in FIG. 7(A). As shown in FIG. 7(B), when the contrast of the object image and the position of focus do not coincide, a difference $\Delta C$ between both the contrast values is generated. Thus, it is possible to effect the detection of focus through the detection as to whether the contrast values on both the image sensors $S_A$ and $S_B$ coincide.

Now, the video circuit $U_2$ will be described.

Since the video circuit $U_2$ provides a video output corresponding to the light intensity distribution of the image of the object according to the driving of the self-scanning type photoelectric converting devices 5a and 5b as mentioned earlier, it will be described in relation to the self-scanning type photoelectric converting devices 5a and 5b with reference to FIG. 8 and the following figures.

Figure 8:
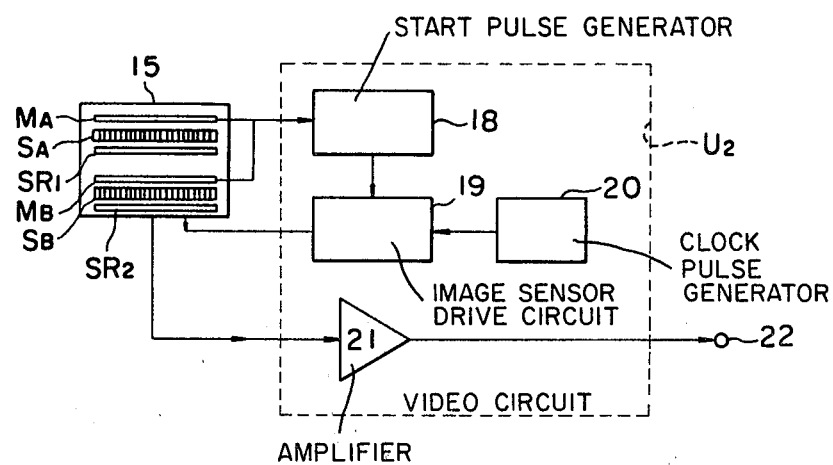
FIG. 8 is a block diagram of the video circuit $U_2$ of the invention.

FIG. 8 shows the principles of the video circuit $U_2$ in a block diagram form.

The video circuit $U_2$ includes a start pulse generator 18, an image sensor drive circuit 19, a clock pulse generator 20 and an amplifier 21.

Figure 11:
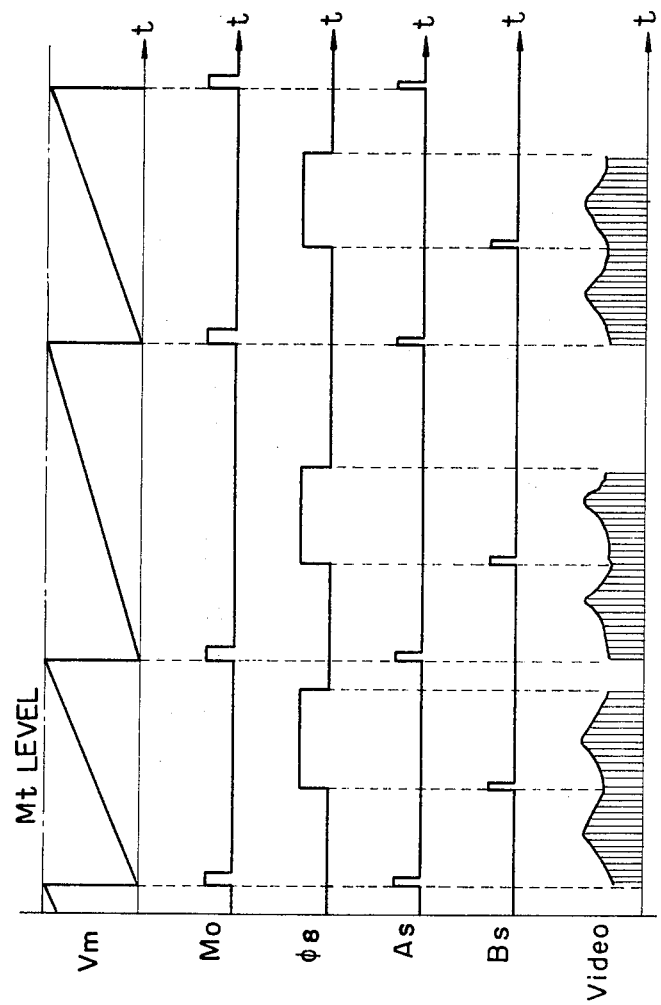
FIGS. 11 and 12 are timing diagrams relating to the operation of the start pulse generator and image sensor drive circuit of the invention.

The total photocurrent provided from the monitor sensors $M_A$ and $M_B$ is coupled to the start pulse generator 18 to produce a pulse train signal at a frequency proportional to the quantity of light incident on the monitor sensors $M_A$ and $M_B$ (labeled $M_O$ in FIG. 11 to be described later). This pulse train signal and a clock pulse signal provided from a clock pulse generator 20 are coupled to an image sensor drive circuit 19, which generates a drive pulse signal for scanning the image sensors $S_A$ and $S_B$. The output signals from the image sensors $S_A$ and $S_B$ are also amplified by an amplifier 21, and the output therefrom is provided as a video signal to an output terminal 22.

In the example of FIG. 8, the A and B image sensors $S_A$ and $S_B$ are serially scanned, and for this reason only a single amplifier 21 is provided as a common amplifier for amplifying the video signal.

Figure 9:
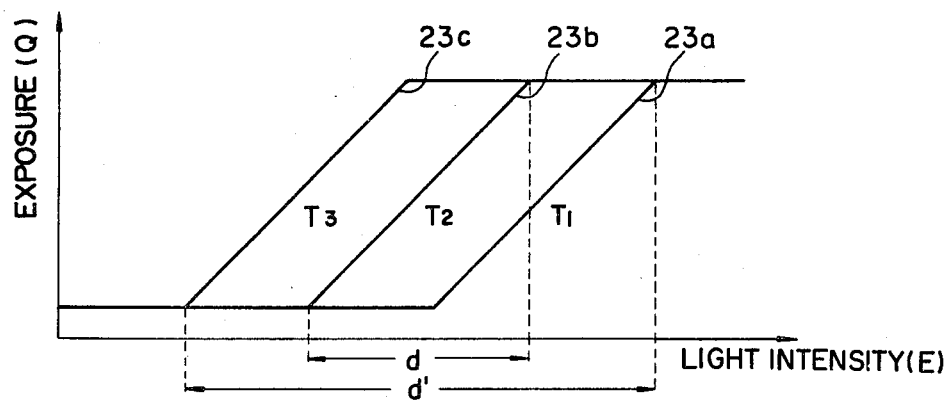
FIG. 9 is a graphical illustration of the photoelectric characteristics of the image sensors of the present invention.

Here, since the image sensors $S_A$ and $S_B$ are of the charge storage type as mentioned earlier, the dynamic range of their photoelectric characteristics may be increased by varying the charge storage period. FIG. 9 schematically shows the photoelectric characteristics of the image sensors $S_A$ and $S_B$. The photoelectric characteristic changes as shown by distribution curves 23a, 23b and 23c for respective charge storage times $T_1$, $T_2$ and $T_3$, and saturation occurs at a certain fixed level. The charge storage times mentioned above are related as $T_1 < T_2 < T_3$. If the charge storage time is fixed to $T_2$, for instance, the unsaturated dynamic range of the photoelectric characteristic is d as is shown. If the charge storage time is changed from $T_1$ to $T_3$ according to the light intensity, the dynamic range is increased to d' as is shown. Thus, it will be understood that the dynamic range of the photoelectric characteristic can be increased in effect by varying the charge storage period according to the brightness of the image of the object. Further, where the charge storage time is varied in inverse proportion to the average brightness of the image of the object, the level of the time sequential photoelectric output read out from the image sensors $S_A$ and $S_B$, i.e., the video output provided from the output terminal 22, is substantially fixed irrespective of variations of the average brightness of the image of the object, and consequently contrast output which will be described later is substantially at a fixed level.

FIG. 10 shows a specific example of the circuit construction of the aforementioned start pulse generator 18 and image sensor drive circuit 19.

In the start pulse generator 18, labeled M is a monitor sensor diode which is shown to represent the aforementioned monitor sensors $M_A$ and $M_B$. Designated at 25 is a constant current source, at 26 a comparator, and at $S_1$ an analog switch.

In the image sensor drive circuit 19, designated at $FF_1$ is a D flip-flop, at 24a, 24b and 24c inverters, at 27 an AND gate, at 28 an 8-bit binary counter, at 29 to 31 OR gates, and at 32 to 34 NOR gates.

The operation of the start pulse generator 18 and image sensor drive circuit 19 will now be described with reference to FIGS. 11 and 12. From the monitor sensor diode M, like the image sensors $S_A$ and $S_B$, a photoelectric conversion signal is extracted by making use of the charge storage mode. More particularly, charge generated in the monitor sensor diode M according to the quantity of the incident light is stored therein due to the capacitance of the internal or external output lines, and a voltage $V_m$ as shown in FIG. 11 is formed on the anode terminal of the monitor sensor diode M. This voltage $V_m$ and a threshold voltage $M_t$ generated across a resistor $R_1$ by a constant current source 25 are compared by the comparator 26. The output $M_0$ of the comparator 26 goes to a high level when the voltage $V_m$ reaches the threshold voltage $M_t$. Since the Q terminal output of the D flip-flop $FF_1$ is held at a high level as will be described hereinafter, the output of the AND gate 27 goes to a high level at this time, thus resetting the D flip-flop $FF_1$. As a result, the Q terminal output of the D flip-flop $FF_1$ is changed to the low level, thus releasing the reset state of the D flip-flop $FF_1$. At the same time, the 8-bit binary counter 28 is released from the reset state to start the counting operation.

Figure 12:
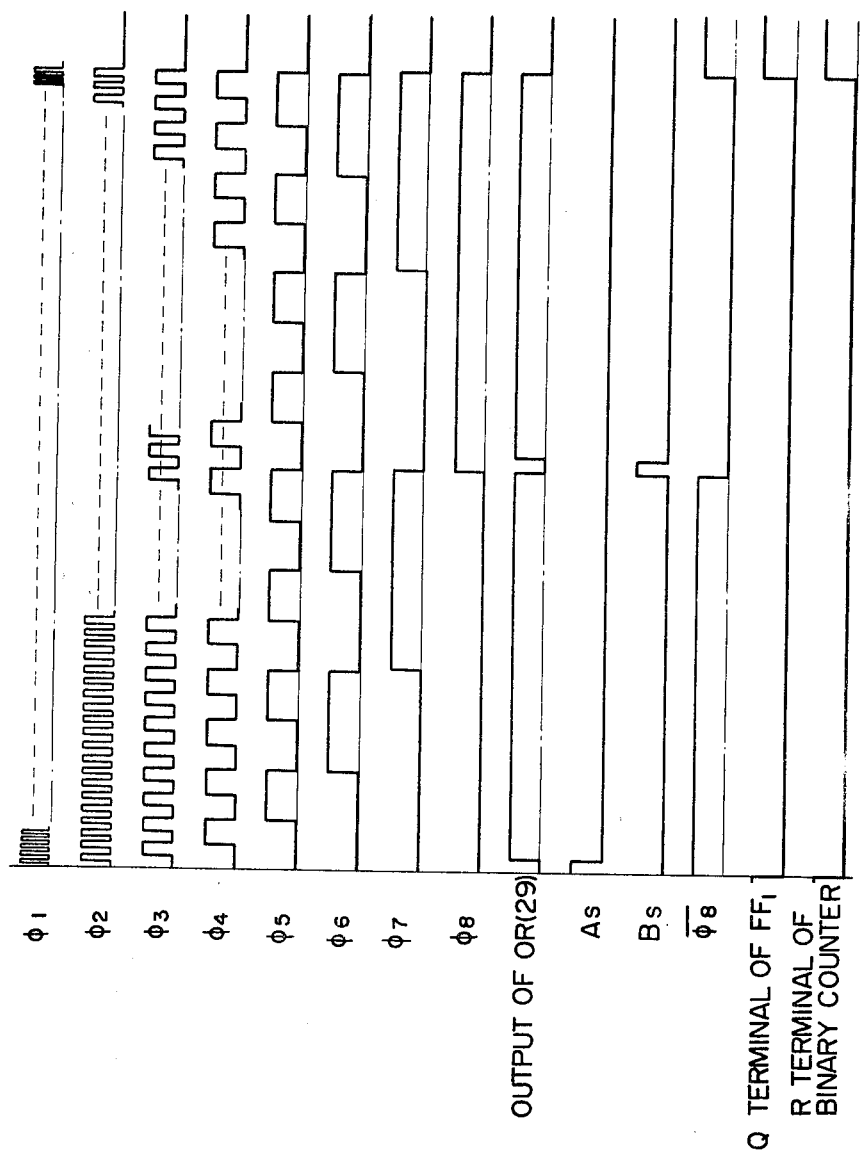

The output at the Q terminal of the D flip-flop $FF_1$ is held at a low level until the next high level pulse (rising of pulse $\overline{\phi_8}$) is coupled to the clock terminal C of the D flip-flop $FF_1$, as shown in FIG. 12. Thus, during this low level period, the output of the AND gate 27 will not be changed to the high level even when the high level output $M_0$ appears at the output terminal of the comparator 26.

Meanwhile, the 8-bit binary counter 28 provides pulse series signals $\phi_1$ to $\phi_8$ as shown in FIG. 12 from respective output terminals $\phi_1$ to $\phi_8$ according to a clock pulse signal (not shown) supplied from a clock pulse generator 20. Of these pulse signals, the signals $\phi_3$ to $\phi_7$ are coupled to an OR gate 29. When the signals $\phi_3$ to $\phi_7$ are all at a low level, a low level signal is provided from the output terminal of the OR gate 29.

The low level output signal of the OR gate 29 and the low level output signal from the terminal $\phi_8$ are coupled to a NOR gate 32 to produce a start pulse $A_S$ from an A image sensor $S_A$. The low level output signal from the OR gate 29 and a signal from the inverter 24b, inverting the high level output signal from the terminal $\phi_8$, are coupled to the NOR gate 33 to produce a start pulse $B_S$ of the B image sensor $S_B$.

The start pulse $A_S$ is coupled to the control terminal of the analog switch $S_1$, whereupon the output of the monitor sensor diode M is reset to $V_S$ level so as to recover the initial state of charge storage. The signal from the terminal $\phi_8$ is coupled through the inverter 24a to the clock terminal C of the D flip-flop $FF_1$, and when the pulse $\phi_8$ is changed from the high level to the low level, i.e., when the pulse $\overline{\phi_8}$ changes from the low level to the high level, the Q terminal output of the D flip-flop $FF_1$ is changed to the high level again to reset the 8-bit binary counter 28, which is held in the reset state until the output of the monitor sensor diode M reaches the threshold voltage $M_t$ again, as mentioned previously. The scanning of both the image sensors $S_A$ and $S_B$ is completed in one period of the pulse signal $\phi_8$, and even if the output $M_0$ of the comparator 26 (timing pulse) is changed to high level before the completion of the aforementioned scanning, it is ignored, and the start pulse $A_S$ and $B_S$ will not be generated.

The signals provided from the terminals $\phi_1$ and $\phi_2$ are processed through the OR gates 30 and 31 and inverter 24c to produce scanning pulse series signals $\phi_A$ and $\phi_B$ for scanning the A and B image sensors $S_A$ and $S_B$. The signal from the terminal $\phi_1$ and the Q terminal output of the D flip-flop $FF_1$ are coupled to the NOR gate 34 to produce a video output reset pulse $\phi_R$ for resetting the photoelectric outputs of the individual bits of the A and B image sensors $S_A$ and $S_B$.

It is to be understood that the start pulses $A_S$ for driving the A image sensor $S_A$ is produced in response to the pulse output $M_0$ of the comparator 26 (start pulse), the scanning of the A image sensor $S_A$ is effected in response to the scanning pulse train signals $\phi_A$ and $\phi_B$ produced under the control of the clock pulses signal, and after this scanning the B image sensor $S_B$ is similarly scanned. The charge storage time of the image sensors $S_A$ and $S_B$ is determined by the interval between adjacent start pulses $A_S$ or $B_S$. With this arrangement, a video output as shown (labeled Video) in FIG. 11 is obtained. Thus, even though the charge storage times in the image sensors $S_A$ and $S_B$ may differ from each other, the bit interval of the video output is constant, so that the construction of the photoelectric output extracting circuit in the following stage can be simplified.

Figure 13:
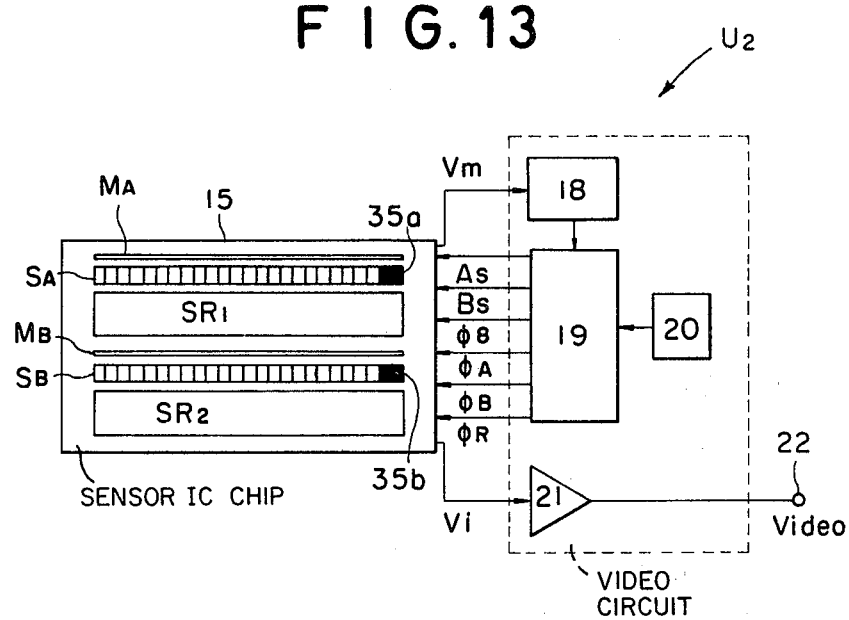
FIG. 13 is a schematic representation of the interconnection between the video circuit $U_2$ and the sensor IC chip 15 of the present invention.

FIG. 13 shows the connection between the video circuit $U_2$, to which the aforementioned individual signal output terminals are connected, and the sensor IC chip 15.

The sensor IC chip 15 may include a well-known noise compensation diode (not shown) for removing noise in the video output and thus enhancing the accuracy of the focus detection.

Figure 14:
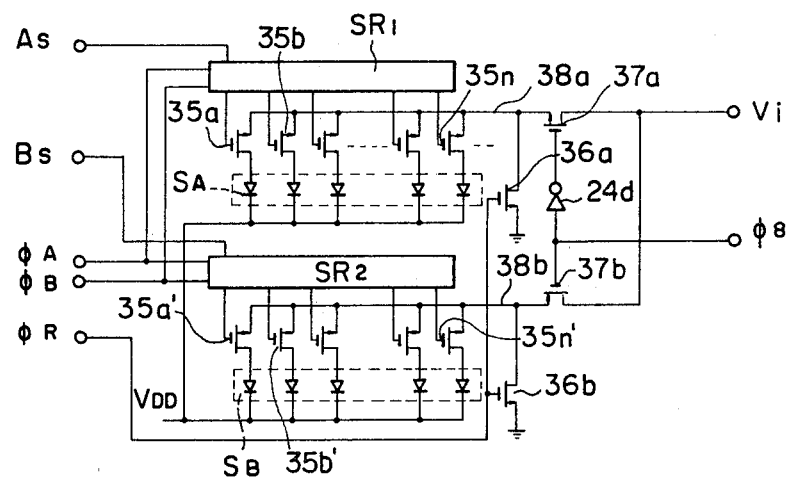
FIG. 14 is a circuit diagram showing the interconnection of the image sensors $S_A$ and $S_B$ of the invention.

FIG. 14 is a circuit diagram showing the connection in the image sensors $S_A$ and $S_B$, i.e., a specific example of the connection of the individual output terminals of the image sensors $S_A$ and $S_B$ to the image sensors. In the Figure, designated at 35a to 35n, 35a' to 35n', 36a, 36b, 37a and 37b are FET gates, and at 24d is an inverter.

The start pulse $A_S$ and scanning pulse series signals $\phi_A$ and $\phi_B$ are coupled to an A shift register $SR_1$ to successively turn on FET gates 35a, 35b to 35n, whereby charges stored in the individual microphotoelectric elements (hereinafter merely referred to as bits) of the A image sensor $S_A$ are successively provided to an output line 38a. Likewise, the start pulse $B_S$ and scanning pulse series signals $\phi_A$ and $\phi_B$ are coupled to a B shift register $SR_1$ to successively turn on FET gates 35a', 35b' to 35n', whereby charges stored in the individual bits of the B image sensor $S_B$ are successively provided to an output line 38b. The outputs of the A and B image sensors $S_A$ and $S_B$ are switched by the FET gates 37a and 37b and inverter 24d controlled by the signal $\phi_8$ to produce a single sequential photoelectric output $V_i$. The image sensor outputs are taken out as voltages across the internal junction capacitances in the microphotoelectric elements (photodiodes) or video line capacitances of the external output lines, and thus the initial state can be recovered by resetting the FET gates 36a and 36b controlled by the signal $\phi_R$ for each bit.

Figure 15:
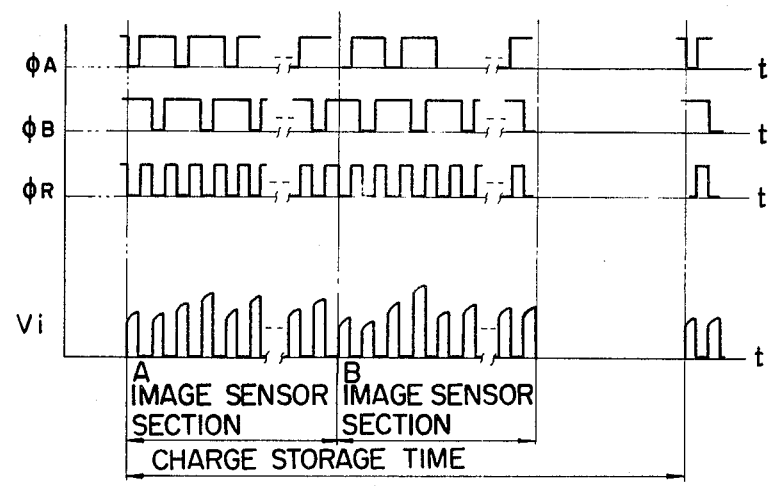
FIG. 15 is a timing chart showing the scanning pulse series signals, reset pulse and sequential photoelectric output of the invention.

FIG. 15 is a timing chart showing the scanning pulse series signals $\phi_A$ and $\phi_B$, reset pulse $\phi_R$ and sequential photoelectric output $V_i$.

The photoelectric output obtained in this way is amplified by the amplifier 21 in the video circuit $U_2$, which provides the video output Video coupled to the following state processing circuit.

Figure 16:
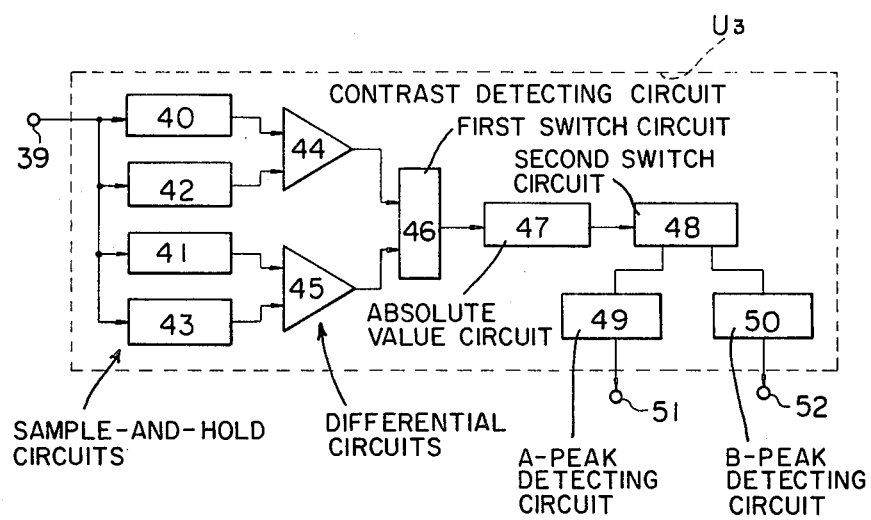
FIG. 16 is a block diagram of the contrast detecting circuit $U_3$ of the present invention.

FIG. 16 shows an example of the circuit construction of the contrast detecting circuit $U_3$. This contrast detecting circuit $U_3$ provides a contrast output derived from the difference between the photoelectric outputs of two bits spaced apart by a constant distance, adjacent but one bits, of each of the image sensors $S_A$ and $S_B$.

In FIG. 16, designated at 40 to 43 are respectively first to fourth sample-and-hold circuits, at 44 and 45 respectively first and second differential circuits, at 46 a first switch circuit, at 47 an absolute value circuit, at 48 a second switch circuit, at 49 an A peak detecting circuit, and at 50 a B peak detecting circuit.

Figure 18:
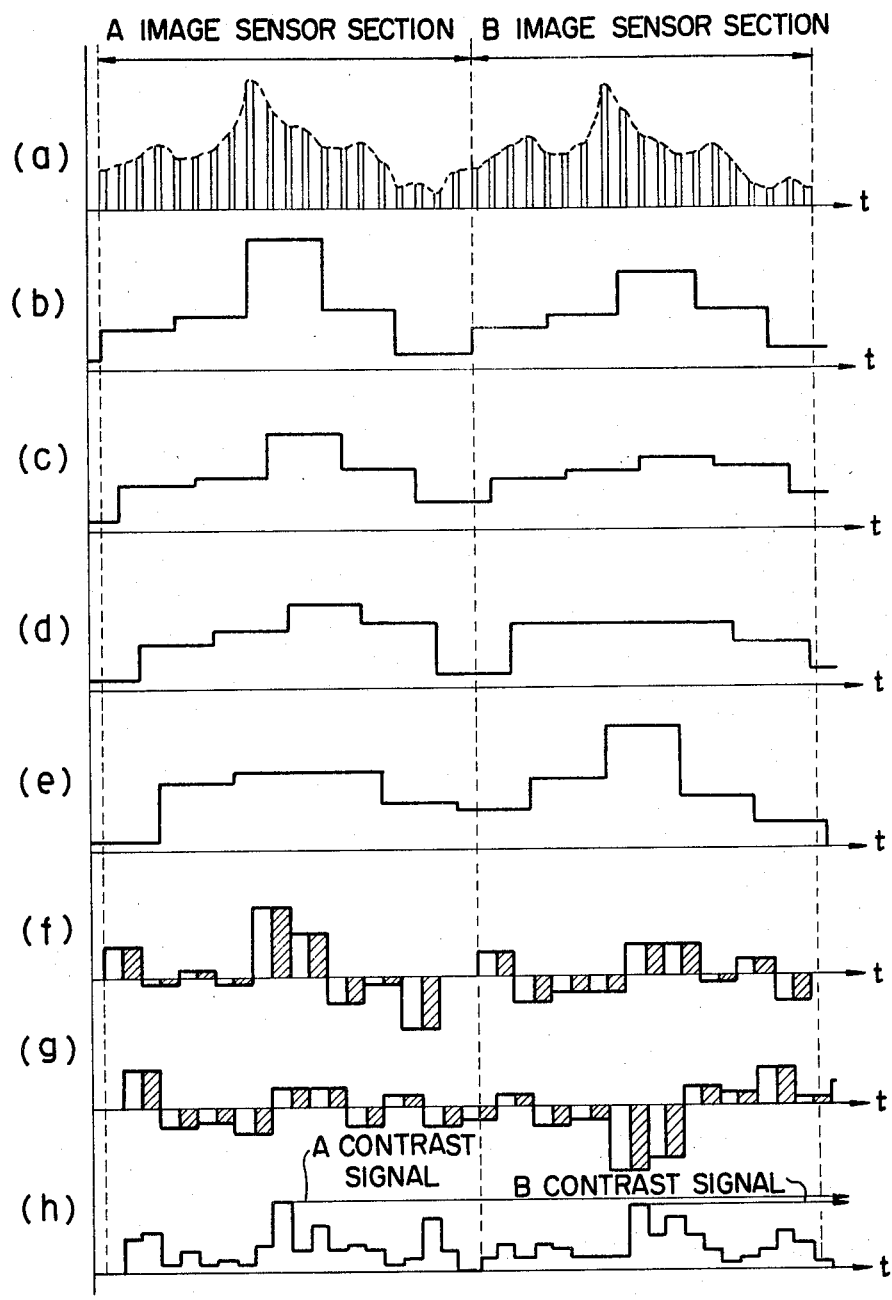
FIG. 18(a)-18(h) are timing diagrams describing the manner of processing the video signal in accordance with the invention.

The video output coupled to terminal 39 is simultaneously coupled to the first to fourth sample-and-hold circuits 40 to 43. For the first sample-and-hold circuit 40, the sample pulse signal is set such that the video signal is sampled and held intermittently for every four bits as shown in FIG. 18(a). The sample pulse signal for the second sample-and-hold circuit 41 is set such that it is delayed after the sample pulse signal for the first sample-and-hold circuit 40 and that the video output is similarly sampled and held for every four bits.

Likewise, the sample pulse signal for the third sample-and-hold circuit 42 is delayed after that for the second sample-and-hold circuit 41, and the sample pulse signal for the fourth sample-and-hold circuit 43 is delayed after that for the third sample-and-hold circuit 42, with the video output being sampled and held for every four bits again with both of them.

The difference between the signals provided from the first and third sample-and-hold circuits 40 and 42 is extracted by the first differential circuit 44. Likewise, the difference between the signals provided from the second and fourth sample-and-hold circuits 41 and 43 is extracted by the second differential circuit 45. The output signals of the first and second differential circuits 44 and 45 are switched by the first switch circuit 46 for every bit of the image sensor, thus providing a single sequential photoelectric output. This synthesized differential signal is converted by the absolute value circuit 47 into a positive or negative absolute value signal. This absolute value signal is then divided into a portion for the image sensor $S_A$ and a portion for the B image sensor $S_B$. These absolute value signals are coupled to the A and B peak detecting circuits 49 and 50, which detect the peak of the respective absolute value waveforms in one scanning period and held until the commencement of the next scanning period.

These peak signals represent the contrast signal of the image of the object, and the contrast signals of the A and B image sensors $S_A$ and $S_B$ are coupled to respective terminals 51 and 52. These contrast signals are respectively referred to as A and B contrast signals $C_A$ and $C_B$ respectively.

Figure 17:
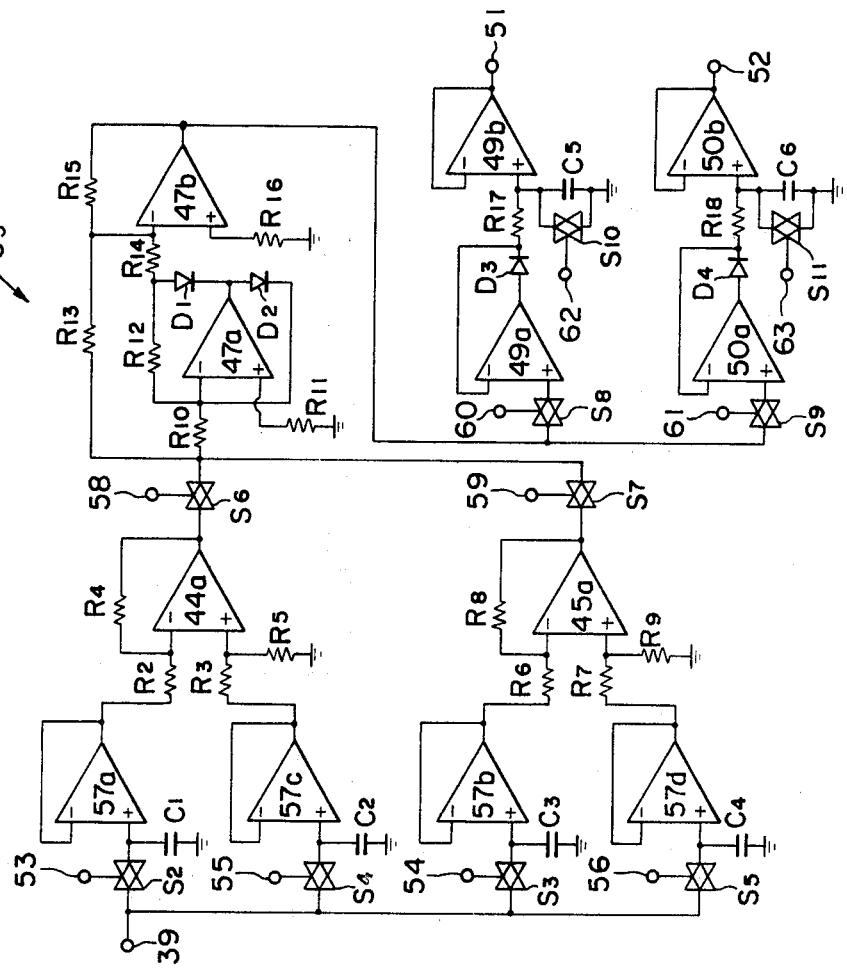
FIG. 17 is a circuit diagram of the contrast detecting circuit of FIG. 16.

FIG. 17 shows a specific example of the circuit of FIG. 16. In the Figure, designated at $S_2$ to $S_{11}$ are analog switches, and at $C_1$ to $C_6$ capacitors. FIGS. 18(a) to 18(h) show the manner of processing of the video signal.

Figure 19:
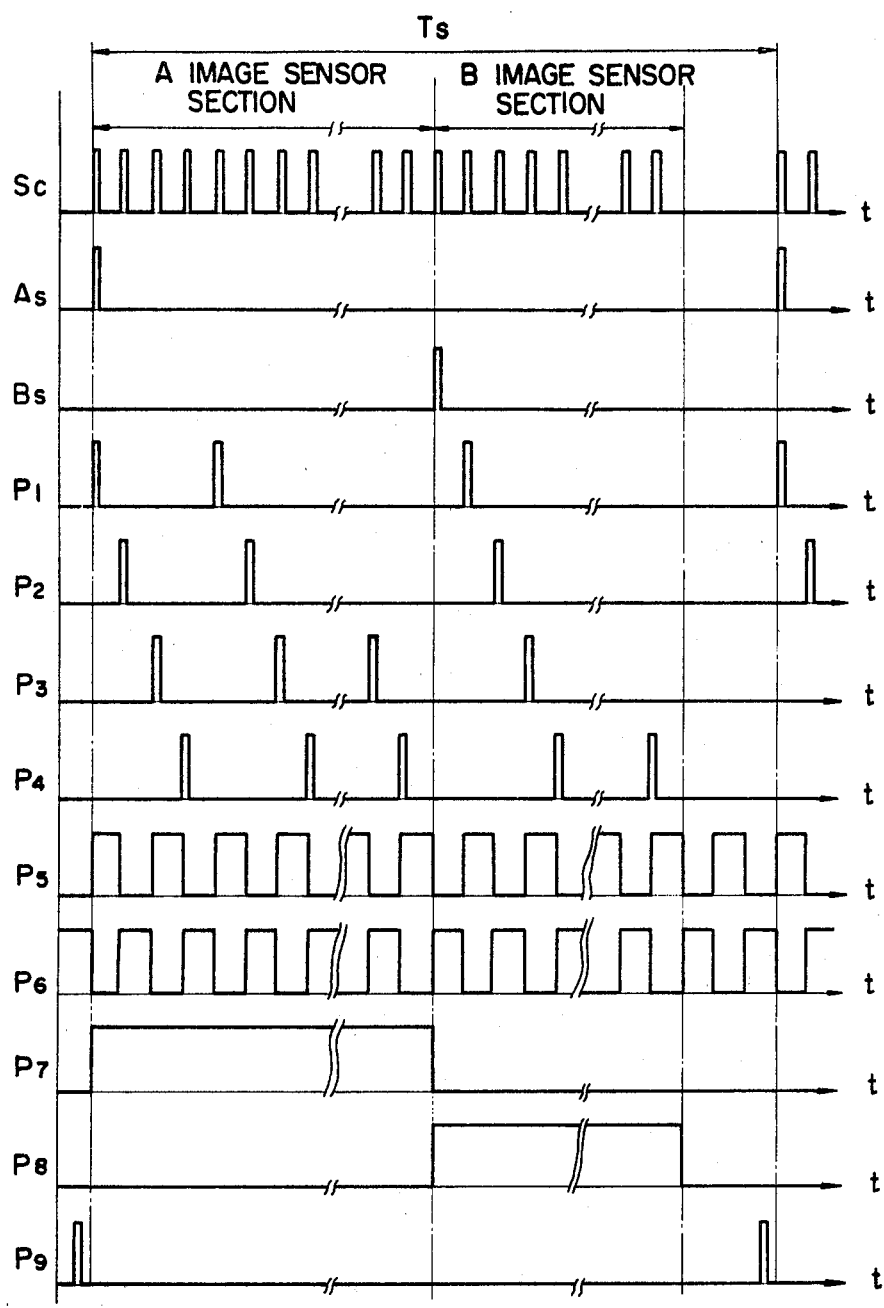
FIG. 19 is a timing diagram showing control pulses used in the circuit of FIG. 17.
Figure 20A:
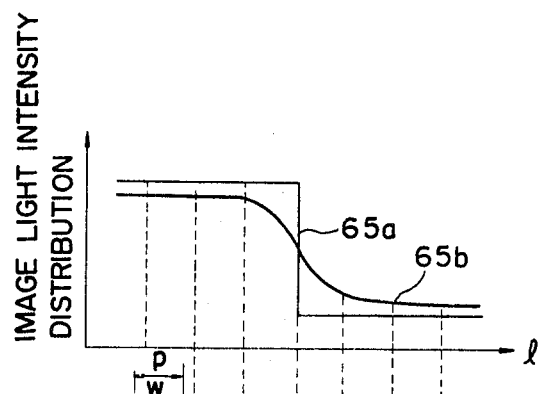
FIGS. 20(A), 20(B), 21, 22(A) and 22(B) are diagrams illustrating pertinent features of the contrast signal derived by the present invention.
Figure 20B:
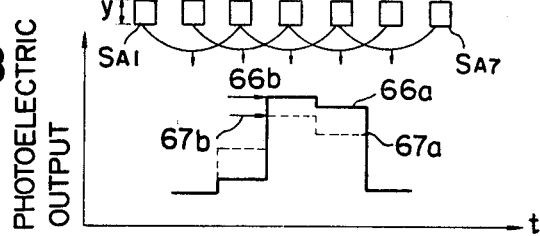

FIG. 19 is a timing chart showing the control pulses of the analog switches $S_2$ to $S_{11}$ used in the circuit of FIG. 17 and the timing $S_C$ of the video outputs of the image sensors $S_A$ and $S_B$. The video output coupled to the terminal 39 is simultaneously coupled to the analog switches $S_2$ to $S_5$ and converted by the capacitors $C_1$ to $C_4$ into sample-and-hold signals. For controlling the analog switches $S_2$ to $S_5$, the sample pulses $P_1$ to $P_4$ are coupled to respective terminals 53 to 56 with timing as shown in FIG. 19. The sampled and held signals from the analog switches $S_2$ and $S_4$ are coupled through operational amplifiers 57a and 57c which serve as buffer amplifiers to an operational amplifier 44a serving as a differential amplifier 44a, and their difference output is extracted. Likewise, the sampled and held signals from the analog switches $S_3$ and $S_5$ are coupled through operational amplifiers 57b and 57d to an operational amplifier 45a serving as a differential amplifier, and their difference output is extracted. The output of the operational amplifier 57a is as shown in FIG. 18(b), and the outputs of the operational amplifiers 57b, 57c and 57d are as shown in FIGS. 18(c), 18(d) and 18(e). FIG. 18(a) shows the video output. The output of the operational amplifier 44a is as shown in FIG. 18(f), and the output of the operational amplifier 45a is as shown in FIG. 18(g). These two difference outputs are alternately switched by analog switches $S_6$ and $S_7$ according to the control pulses $P_5$ and $P_6$ supplied to the terminals 58 and 59, thus providing a single sequential signal. This synthesized difference output is converted by an operational amplifier 47a and diodes $D_1$ and $D_2$ into a positive absolute value signal. The absolute value signal obtained in this way is as shown in FIG. 18(h), and it corresponds to the absolute values of the signals in the shaded portions in FIGS. 18(f) and 18(g). This absolute value signal corresponds to the difference between the photoelectric outputs between two adjacent but one bits of the video output. The absolute value signal is amplified by an operational amplifier 47b and then simultaneously coupled to two analog switches $S_8$ and $S_9$. To the terminal 60 of the analog switch $S_8$, a control pulse signal $P_7$ as shown in FIG. 19 is coupled, and the peak of the absolute value signal in one scanning period for the A image sensor $S_A$ is held by an operational amplifier 49a, a diode $D_3$ and a capacitor $C_5$. Likewise, to the terminal 61 of the analog switch $S_9$, a control pulse $P_8$ is coupled, and the peak for the B image sensor $S_B$ is held by an operational amplifier 50a, a diode $D_4$ and a capacitor $C_6$. The analog switches $S_{10}$ and $S_{11}$ are provided for causing the discharge of the capacitors $C_5$ and $C_6$ for every scanning period by coupling the control pulse $P_9$ to the terminals 62 and 63. These peaks are coupled through operational amplifiers 49b and 50b to obtain the A and B contrast signals at the respective terminals 51 and 52.

FIGS. 20(A), 20(B), 21 and 22(A) and 22(B) show the feature of the aforementioned contrast signal. If the image of the object provides a light intensity distribution of a distribution curve 65a at the time of focusing, the light intensity distribution at the time other than the time of focusing is as shown by the curve 65b. Here, the abscissa is taken as the distance l covered in a plane perpendicular to the optical axis. When light of such light intensity distribution is incident on the individual bits $S_{A1}$ to $S_{A7}$ of the image sensor, those bits having length and width dimensions y and w and being spaced apart at a pitch p, light is received in each bit in an area of w×y and is converted to a photoelectric output, whereby the difference between the photoelectric outputs of two bits relates to a center-to-center distance of 2p. The solid plot 66a represents the distribution of the photoelectric output difference corresponding to the distribution curve 65a, while the dashed plot 67a represents the distribution of the photoelectric output difference corresponding to the distribution curve 65b. The peaks of these photoelectric output difference distributions constitute the contrast signals 66b and 67b, and these contrast signals are reduced as the image of the object gets out of the state of focus.

Figure 21:
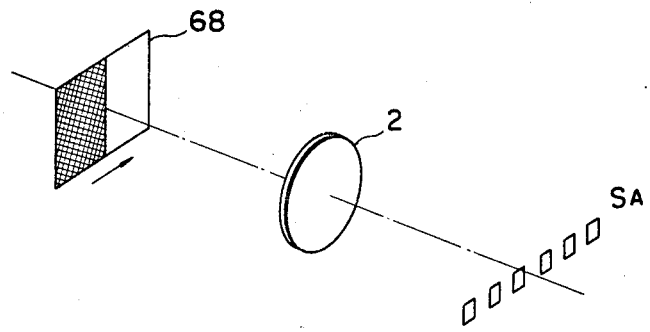
Figures 22A, 22B:
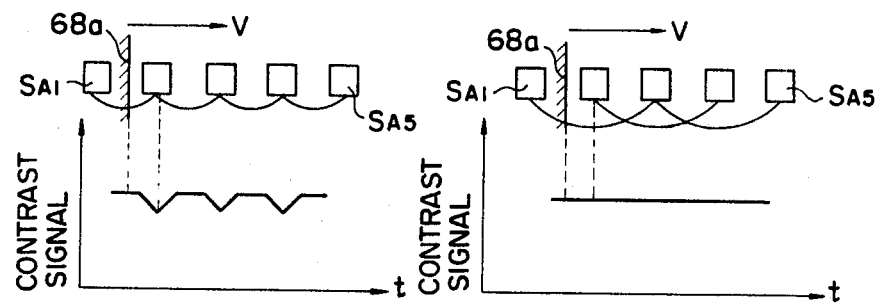

Considering now that an edge chart 68 having bright and dark sections as shown in FIG. 21 is projected onto the bit row of the image sensor $S_A$, in the case of a system wherein the difference between the photoelectric outputs of adjacent bits is detected, with the movement of the edge chart 68 in the lateral direction at a speed v, the contrast signals are reduced when the edge of the image of the edge chart 68a enters the opening of each bit in the image sensor as shown in FIG. 22(A). This means that the contrast signals are varied with the swing of the object caused by hand movement or the like, and in this case precise detection of focus cannot be obtained. In contrast, with the system wherein the difference of photoelectric outputs of all adjacent bits but one is detected as mentioned previously, the contrast signals are steady and will not vary regardless of the movement of the image 68a of the edge chart as shown in FIG. 22(B), and consequently precise focus direction can be obtained. In FIGS. 22(A) and 22(B), the abscissa is taken for time corresponding to the extent of movement of the edge of the image 68a of the edge chart.

Figures 23, 24:
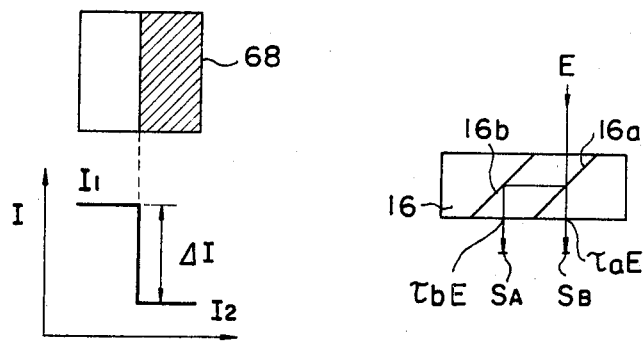

Now, the method of detecting the state of focus from the aforementioned contrast signals A and B will be described with reference to FIGS. 23 to 26(A) and 26(B). If the light intensities of the bright and dark sections are $I_1$ and $I_2$ and the difference therebetween is $\Delta I$ as shown in FIG. 23, the corresponding photoelectric outputs $V_1$ and $V_2$ are proportional to the respective light intensities $I_1$ and $I_2$. Thus, the photoelectric output difference is given as $\Delta V = V_1 - V_2 = K$ and $\Delta I = K(I_1 - I_2)$, where K is the proportionality constant. With the object image E split into two by the light splitter 16, the energy of light incident on the A image sensor $S_A$ is $\tau a E$ on the A image sensor $S_A$ and $\tau b E$ on the B image sensor. The factors $\tau a$ and $\tau b$ are light permeabilities of the light paths of the split light fluxes. The light transmittance for the light flux projected onto the A image sensor $S_A$ is chiefly determined by the transmission factor of the half reflection mirror 16a, while that for the light flux projected onto the B image sensor $S_B$ is substantially determined by the combination of the light reflection factors of the half reflection mirror 16a and total reflection mirror. Where the light transmittances $\tau a$ and $\tau b$ of the two light paths are different, when the image of the edge chart 68 is forcused on the A image sensor $S_A$, the photoelectric output difference $\Delta Va = V_{1a} - V_{2a} = K \cdot \tau a \cdot \Delta I = \tau a(I_1 - I_2)$, as shown in FIGS. 25A and 25B. When the image of the edge chart 68 is forcused on the B image sensor $S_B$, the photoelectric output difference $\Delta Vb$ is $\Delta Vb = V_{1b} - V_{2b} = K \cdot \tau b \cdot \Delta I = K \cdot \tau b(I_1 - I_2)$. With the video outputs as shown in FIGS. 25(C) and 25(D), the photoelectric output difference signal in the state of forcus is as shown in FIG. 25(E). In this case, the A and B contrast signals which represent the peaks for the A and B image sensors $S_A$ and $S_B$ do not coincide, and their ratio is equal to the ratio $\tau a/\tau b$ of the light transmittances. The relation of the A and B contrast signals to the magnitude of extension $l_e$ is as shown in FIG. 26B. If the A and B contrast signal distributions $C_A$ and $C_B$ have the same shape, the point of intersection of these distribution curves constitute position 71 of foucs, the focus is found on the film equivalent plane 72. However, when the A and B contrast signals obtained with the focus of image on the A and B image sensors $S_A$ and $S_B$ (at positions 73 and 73') have different values, for instance when the A contrast signal distribution is as shown by a dashed curve $C_A'$, the intersection of the two distribution curves is found at a position 74 which is deviated from the position 71 of focus.

Thus, for obtaining precise focus detection, both the A and B contrast signal distributions $C_A$ and $C_B$ have to be symmetrical to each other as is shown.

The invention is based upon the fact that the levels of the A and B contrast signals provided from the aforementioned contrast detecting circuit $U_3$ are respectively proportional to the light transmittance of the light paths for the light fluxes in the light splitter 16, and either one of the A and B contrast signals $C_A$ and $C_B$ is amplified or attenuated such as to compensate for the difference between the light transmittances mentioned above, thereby obtaining symmetrical A and B contrast signal distributions to solve the problems stemming from the departure from the balance of the two light transmittances.

For example, if the amplification or attenuation is effected such that the photoelectric output difference $\Delta Va$ is $\Delta Va' = \Delta Va \cdot (\tau b/\tau a)$, symmetrical A and B contrast signal distributions can be obtained.

Now, the focus judging circuit $U_4$ will be described. The circuit $U_4$ produces focus indication signals representing the state of focus, pre-focus state, post-focus state incapable of focus detection from the aforementioned contrast signals $C_A$ and $C_B$.

FIG. 27 shows an example of the basic construction of the focus judging circuit $U_4$.

In the Figure, designated at 75 is an input terminal to which the A contrast signal $C_A$ is coupled, at 76 an input terminal to which the B contrast signal $C_B$ is coupled, at 77 a contrast compensation circuit, at 78 a focus detecting circuit, at 79 a direction detecting circuit, at 80 an incapability (NG) detecting circuit, at 81 a focus effective region judging circuit, at 82 a focus state judging circuit, at 83 a pre-focus indication signal output terminal, at 84 a focus indication signal output terminal, and at 85 a post-focus indication signal output terminal.

The A and B contrast signals $C_A$ and $C_B$ appearing at the respective terminals 75 and 76 are coupled to the contrast compensation circuit 77, which provides a symmetrical contrast signal distribution output which is coupled to the focus detecting circuit 78 and focus effective region judging circuit 81. The focus detecting circuit 78 provides a signal representing the state of focus, the direction circuit 79 provides a signal representing the pre-focus and post-focus states, and the NG detecting circuit 80 provides a signal representing the state incapable of the focus detection. These signals are coupled together with the output signal of the focus effective region judging circuit 81 to a focus state judging circuit 82 for logical processing therein. As a result, the pre-focus indication signal appears at the terminal 83, the focus indication signal at the terminal 84 and the post-focus indication signal at the terminal 85. The focus detection incapability signal is provided to the terminals 83 and 85 simultaneously.

Figure 28:
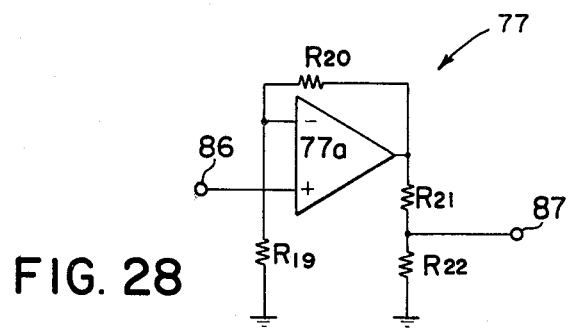
FIG. 28 is a diagram of the compensation circuit 77 of the present invention.

The contrast compensation circuit 77 amplifies or attenuates either one or both of the A and B contrast signals $C_A$ and $C_B$ for compensating the A and B contrast signal distributions for the out-of-balance condition therebetween due to the aformentioned out-of-balance condition between the light transmittances of the light splitter 16. This contrast compensation circuit 77 may have a circuit construction as shown in FIG. 28.

In the Figure, designated at 86 is an input terminal of the A or B contrast signal, at $R_{19}$, $R_{20}$ and $R_{21}$ are fixed resistors, and $R_{22}$ a variable resistor. The resistances of the fixed resistors $R_{19}$ to $R_{21}$ are set to suitable values.

By suitably adjusting the variable resistor $R_{22}$, the A or B contrast signal coupled to a terminal 86 is amplified or attenuated to a required level to be provided from a terminal 87. By setting the amplification or attenuation factor such as to match the ratio of the individual light path light transmittances in the light splitter 16, the A and B contrast signals may be balanced with each other.

Figure 29A:
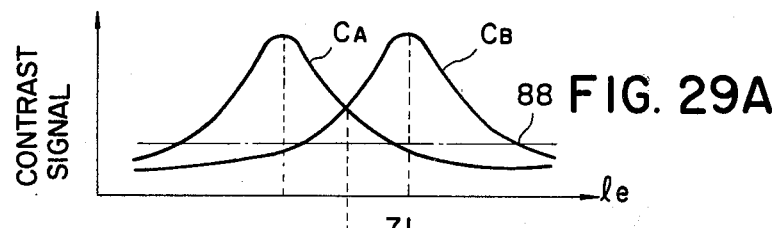
FIGS. 29(A)-(C) are wave form diagrams used to describe the function of the focus judging circuit $U_4$ of the present invention.
Figure 29B:
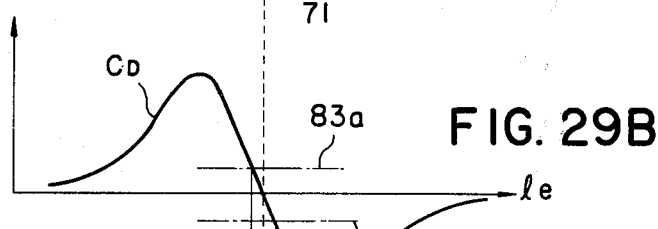
Figure 29C:
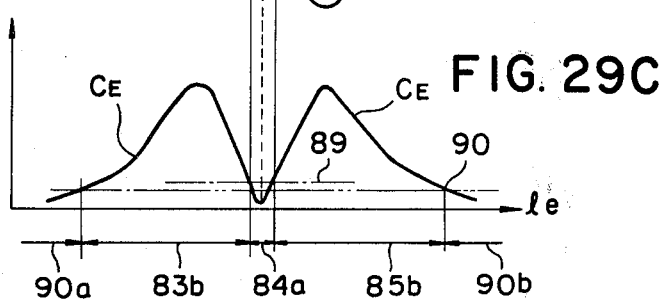

Now, the principle under which the focus judging circuit $U_4$ judges the state of focus will be described with reference to FIGS. 29(A), 29(B) and 29(C). The distribution curves of the A and B contrast signals $C_A$ and $C_B$ are obtained with respect to the magnitude of lens extension $l_e$ as shown in FIG. 29(A), and the intersection of these curves corresponds to the precise focus position. These contrast signals $C_A$ and $C_B$ are obtained as a result of the aforementioned compensation in the contrast compensation circuit 77. A focus effective area limit level 88 is preset, and the focus indication signal is allowed to be provided only when both the contrast signals $C_A$ and $C_B$ are above the level 88. The contrast signals $C_A$ and $C_B$ are subtracted from one another as shown in FIG. 29(B), and if the resultant difference signal $C_D$ ($=C_A=C_B$) is positive, the pre-focus indication signal 83a is provided, while otherwise providing the post-focus indication signal 85a. When the absolue value $|C_D|=C_E$ of the aforementioned difference signal $C_D$ is lower than the focus detection threshold level 89 and is within the aforementioned focus indication effective range, it is judged that there is a focus indication region 84a, and the focus indication signal is provided. When the absolute value $C_E$ is not in the focus indication effective region and is lower than the NG level 90, there are NG display regions 90a and 90b, and the focus detection incapability signal is provided. In areas other than the focus indication region 84a and focus detection incapability regions 90a and 90b, i.e., in pre-focus and post-focus indication regions 83b and 85b, the aforementioned pre-focus and post-focus indication signals are provided. The focus indication region 84a corresponds to a portion of the contrast difference signal between both the threshold levels 83a and 85a as shown in FIG. 29(B). While the focus indication signal is provided even in areas slightly deviated from the precise focus position 71, the deviation area may be made sufficiently narrow to regard it to be the same as the focus position in practice.

By providing a certain width for the focus indication region 84a, a steady focus display can be obtained at the time of the actual photographing.

The position 71 of intersection (i.e., position of focus) is not changed, even if the distributions of the A and B contrast signals $C_A$ and $C_B$ are increased or reduced while maintaining their balance.

This means that precise focus detection can be obtained irrespective of the degree of contrast of the image of the object. This effect is an advantage of the system, in which two self-scanning type photoelectric converting devices are provided on opposite sides of the film equivalent surface.

Figure 30:
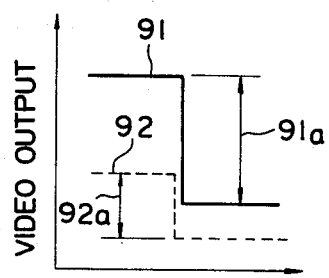
FIGS. 30 and 31 are wave form diagrams pertaining to the change in contrast of the image of an object and the contrast signal distribution curve relating to the operation of the present invention.
Figure 31:
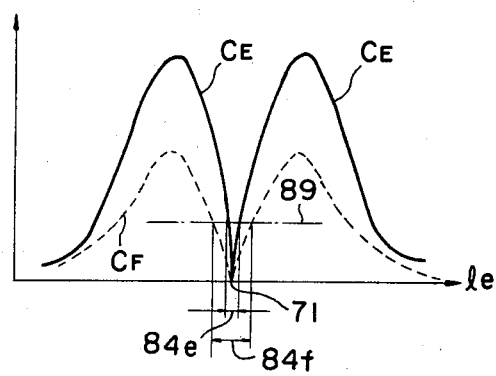

However, where the focus indication region 84a which has a certain width is set in the neighborhood of the focus position as mentioned earlier, if the focus detection threshold level 89 is fixed, the width of the focus indication region 84a is subject to change in accordance with changes in the contrast of the image of the object. For example, if the video output distribution is changed from a state 91 to a state 92 with a change in the contrast of the image of the object as shown in FIG. 30, the photoelectric output difference is changed from value 91a to value 92a. At this time, the absolute value of the difference between the A and B contrast signals $C_A$ and $C_B$ is reduced from that of the distribution curve $C_E$ to that of the distribution curve $C_F$ as shown in FIG. 31. If the focus detection threshold level 89 is fixed as is shown, focus indication regions 84e and 84f are obtained with respect to the respective distribution curves $C_E$ and $C_F$. It will be seen that, if the contrast of the image of the object is reduced, the width of the focus indication region 84f is increased.

With such a system, as the contrast is reduced, the accuracy of focus is reduced, and the focus display state becomes unstable in the neighborhood of the position of focus.

Figure 32A:
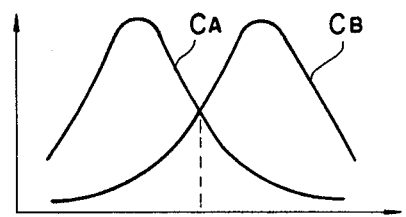
FIGS. 32(A)-(F) depict the distributions of various contract signals, pertinent to an explanation of the operation of the present invention.
Figure 32D:
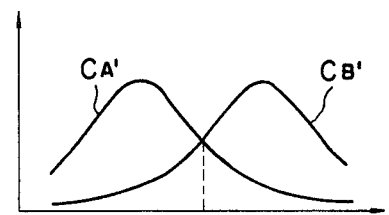
Figure 32B:
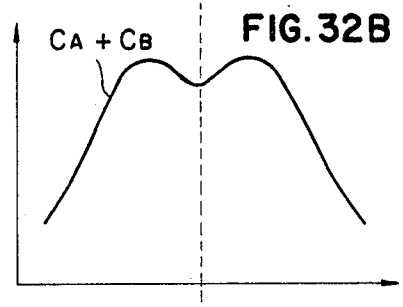
Figure 32E:
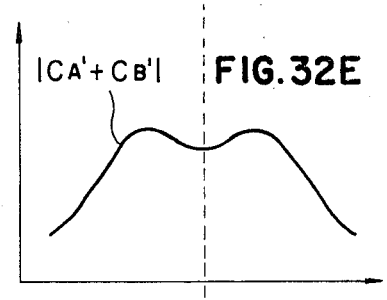
Figure 32C:
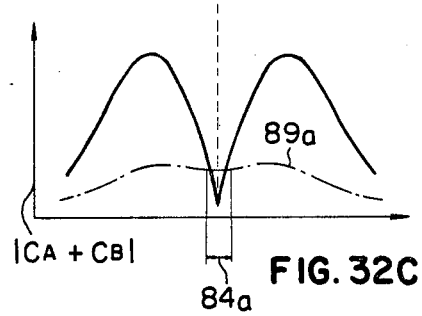
Figure 32F:
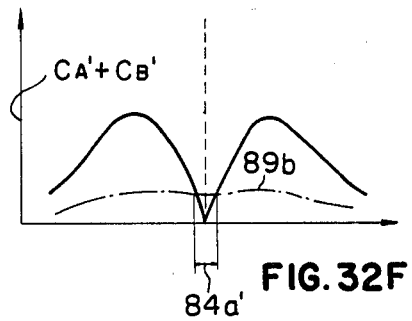

In order to overcome the above drawback, according to the invention, the aforementioned focus detection threshold level 89 is set to be proportional to the sum of the A and B contrast signals, whereby a focus indication region free from the contrast of the image of the object is obtained. FIG. 32(A) shows the distributions of the A and B contrast signals $C_A$ and $C_B$, and FIG. 32(D) shows lower contrast signals $C_A'$ and $C_B'$ than the case of the FIG. 32(A). FIG. 32(B) shows the sum of the A and B contrast signals $C_A$ and $C_B$ shown in FIG. 32(A), and FIG. 32(E) shows the sum of the A and B contrast signals $C_A'$ and $C_B'$ shown in FIG. 32(D). Values which are proportional to these sums are set as focus detection threshold levels 89a and 89b as shown in FIGS. 32(C) and 32(F). By so doing, the focus indication regions 84a and 84a' have substantially the width, so that it is possible to obtain precise and stable focus detection irrespective of the contrast of the image of the object.

Figure 33:
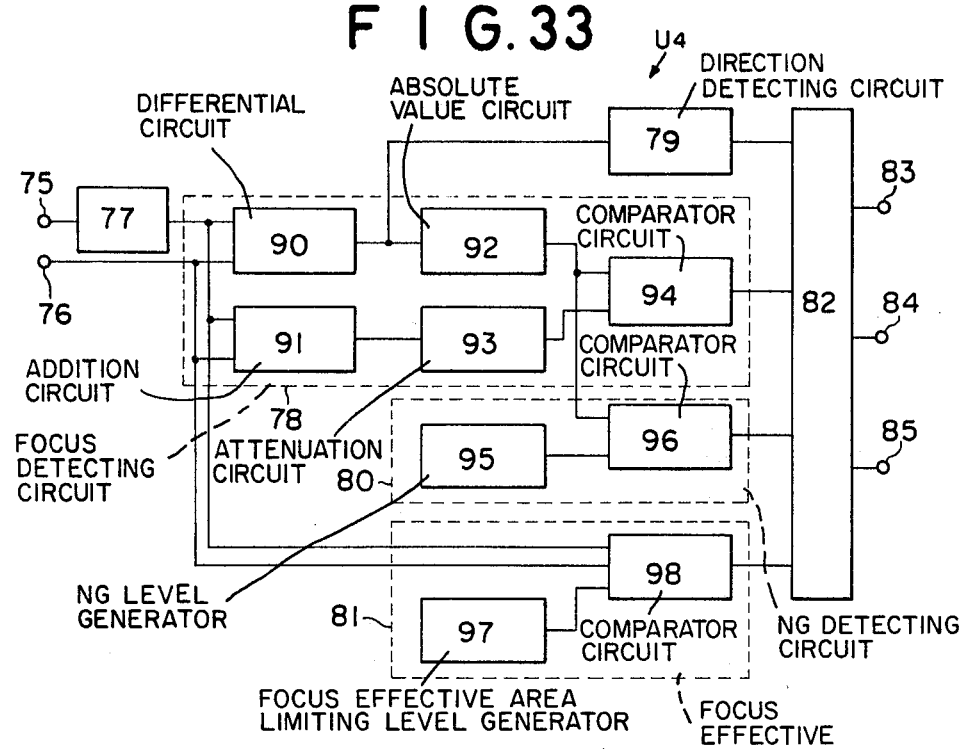
FIG. 33 is a block diagram of the focus judging circuit $U_4$.

FIG. 33 shows a block diagram of an example of the detailed construction of the focus judging circuit $U_4$ shown in FIG. 27.

The focus judging circuit 78 includes a differential circuit 90, an addition circuit 91, an absolute value circuit 92, an attenuation circuit 93 and a comparator circuit 94.

The NG detecting circuit 80 includes an NG level generator 95 and a comparator circuit 96, and the focus effective region judging circuit 81 includes a focus effective area limiting level generator 97 and a comparator circuit 98.

The A contrast signal $C_A$ coupled to a terminal 75 is corrected by the contrast compensation circuit 77 such as to maintain balance with respect to the B contrast signal $C_B$, and the corrected A contrast signal $C_{A1}$ and the B contrast signal $C_B$ are coupled to the differential circuit 90, in which the difference of these two input signals is detected. From this difference output the direction detecting circuit 79 extracts the signal representing the pre-focus and post-focus states. The difference output is also coupled to the absolute value circuit 92, which provides a signal corresponding to the absolute value of the difference between A and B contrast signals.

Meanwhile, the corrected A contrast signal $C_{A1}$ and B contrast signal $C_B$ are coupled to the addition circuit 91, and the output thereof is attenuated in the attenuating circuit 93 at a constant ratio to the focus detection threshold level, which is compared in the comparator circuit 94 with the absolute value output from the absolute value circuit 92. The aforementioned absolute value output is compared in the comparator circuit 96 with the NG level provided from the NG level generator 95. The corrected A contrast signal $C_{A1}$ and B contrast signal $C_B$ are further compared in the comparator circuit 98 with the focus effective region limiting level provided from the focus effective region limiting level generator 97. The outputs of the direction detecting circuit 79 and comparators 94, 96 and 98 are coupled to the focus state judging circuit 82, and the signal representing the focus state as mentioned is provided at the terminals 83 to 85.

Figure 34:
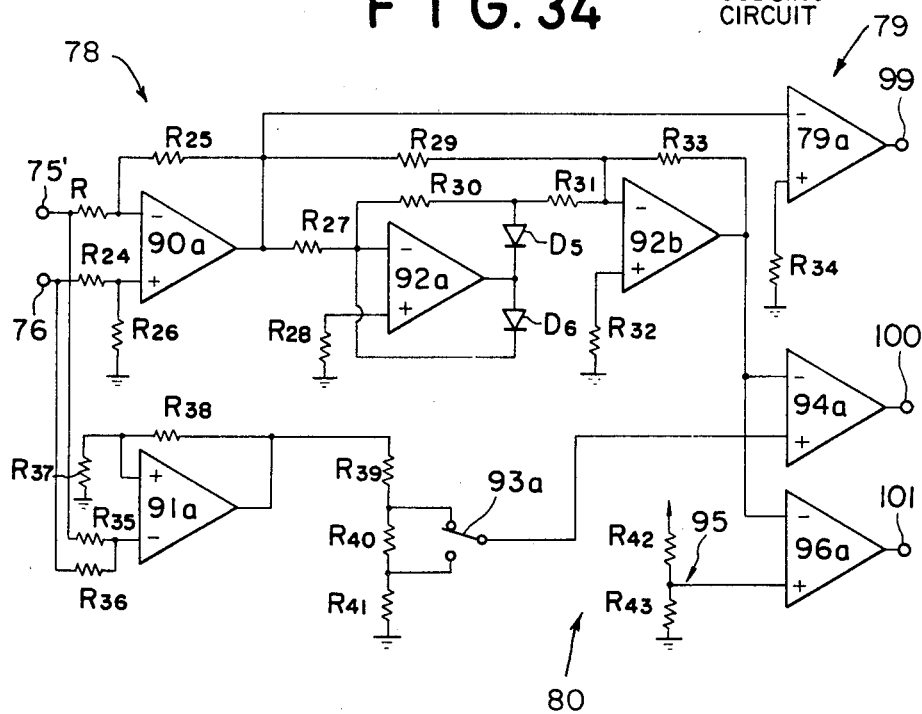
FIG. 34 is a schematic circuit diagram of the direction detecting circuit 79, focus detecting circuit 78 and NG detecting circuit 80 of FIG. 33.

FIG. 34 shows a specific example of the detailed construction of the direction detecting circuit 79, focus detecting circuit 78 and NG detecting circuit 80 in the focus judging circuit $U_4$ shown in FIG. 33.

The operation of these circuits will now be described together with their construction. An operational amplifier 90a which serves as a differential circuit extracts the difference between the corrected A contrast signal $C_{A1}$ coupled to the terminal 75' and the B contrast signal $C_B$ coupled to the terminal 76, while an operational amplifier 91a which serves as an addition circuit extracts the sum of the two input signals.

The difference signal provided as the output signal of the operational amplifier 90a is converted through the operational amplifier 92a, diodes $D_5$ and $D_6$ and operational amplifier 92b into its absolute value signal, which is coupled to comparators 94a and 96a.

The difference signal as the output signal of the operational amplifier 90a is coupled to a comparator 79a which constitutes the direction detecting circuit 79, and a digital signal therefrom which indicates whether the difference signal is positive or negative is coupled to a terminal 90. Meanwhile, the signal obtained from the operational amplifier 91a is attenuated at a fixed ratio through resistors $R_{39}$ to $R_{41}$ which constitute the attenuating circuit 93 to the focus detection threshold level. A switch 93a is provided for switching the focus detection threshold level to one of two levels. This switch 93a permits the adjustment of the precision of the focus detection. While, in the example of FIG. 34, two selectable threshold levels are provided, it is also possible to provide three or more selectable threshold levels. The focus detection threshold level is coupled to a comparator 94a, and a digital signal representing the magnitude relation of the aforementioned difference absolute value signal is provided to a terminal 100. The NG level is provided through resistors $R_{42}$ and $R_{43}$ which constitute the level generator 95, and it is compared with the difference absolute value signal, and a digital signal representing their magnitude relation is provided to the terminal 101.

Figure 35:
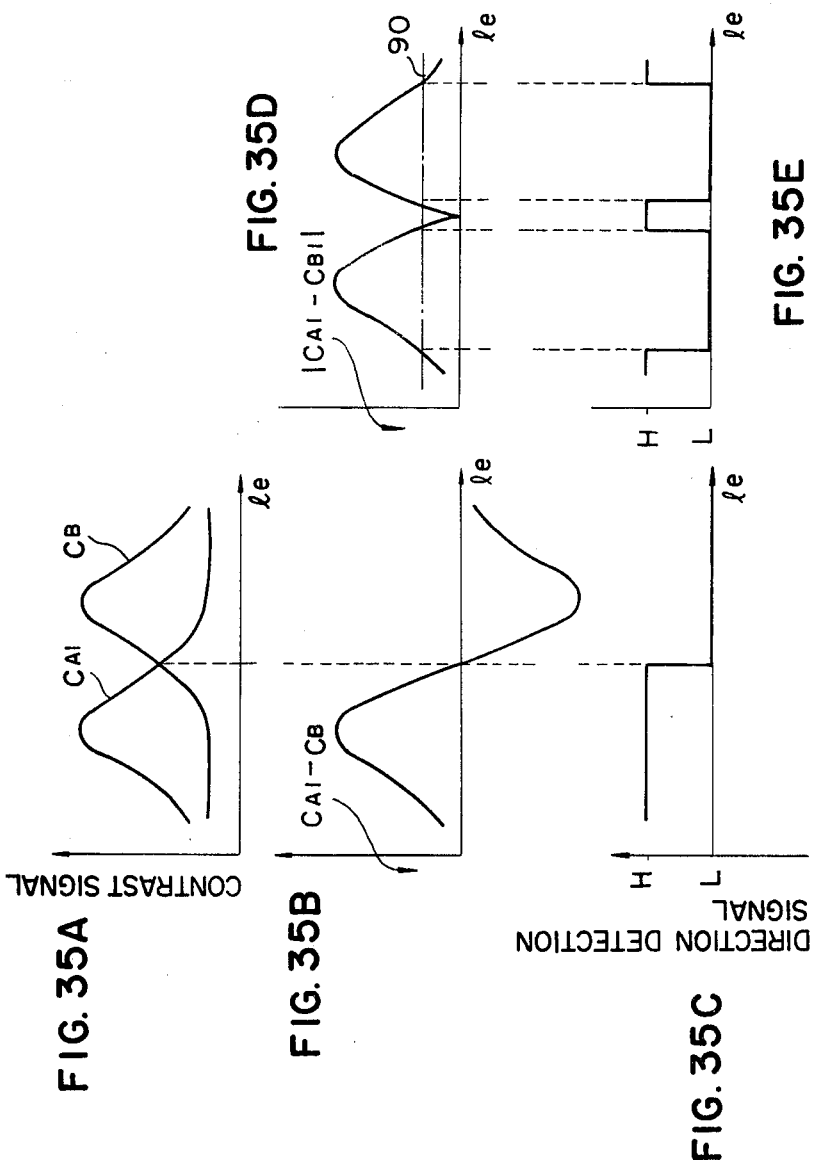
FIGS. 35(A)-(E) depict digital signals appearing at the terminals 99-101 of FIG. 34.

FIGS. 35(A) to 35(E) show the digital signals appearing at the terminals 99 to 101. More particularly, FIG. 35(A) shows the corrected A contrast signal $C_{A1}$ and B contrast signal $C_B$, FIG. 35(B) shows their difference signal, and FIG. 35(D) shows the absolute value of the difference signal. FIG. 35(C) shows the digital signal appearing at the terminal 99. It represents the pre-focus state when it is at high level and the post-focus state when it is at low level. FIG. 35(E) shows the digital signal appearing at the terminal 101. It is at high level when the NG level 90 is higher than the difference absolute value signal.

Figure 36:
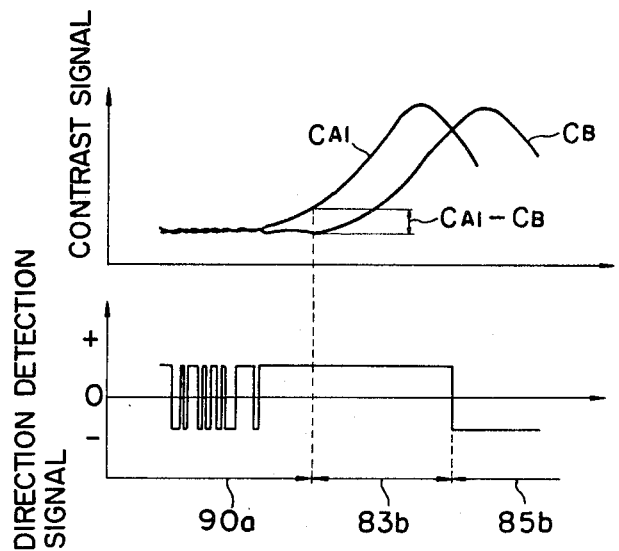
FIGS. 36(A)-(B) depict a low level digital signal corresponding to that shown in FIG. 35(C).

The digital signal as shown in FIG. 35(C) may often show the low level as shown in FIGS. 36(A) and 36(B) for the corrected A contrast signal $C_{A1}$ and B contrast signal $C_B$ coincide when the deviation from focus is increased. Accordingly, the aforementioned NG detecting circuit 80 is provided for the purpose of inhibiting the display of the pre-focus and post-focus states as the NG display region 90a when the difference between the signals $C_{A1}$ and $C_B$ becomes lower than the NG level 80.

FIGS. 37 and 38(a) to 38(h) illustrate the operation of the aforementioned focus effective region judging circuit 81.

While the focus indication signal is allowed to be provided only when the contrast signals $C_{A1}$ and $C_B$ are both higher than the focus effective region limiting level 88, these contrast signals vary in level depending upon the object. Therefore, if the focus effective region limiting level 88 is fixed, it is liable that the display of focus is allowed when the state of focus is not present.

FIG. 38(a) shows comparatively high level contrast signal distributions, and FIG. 38(e) shows comparatively low level contrast signal distributions. FIGS. 38(b) and 38(f) show the absolute value signals of the corresponding contrast signal differences. With the illustrated setting of the fixed focus effective region limiting level 88 and focus detection threshold levels 89a and 89b, focus effective regions 104 and 104' are obtained, and at this time focus indication signals are shown in FIGS. 38(c) and 38(g) are obtained. While the precise focus indication signal is obtained in the case of FIG. 38(g), in the case of FIG. 38(c) a false focus indication signal appears as shown by the shaded portion in FIG. 38(c).

Figure 37:
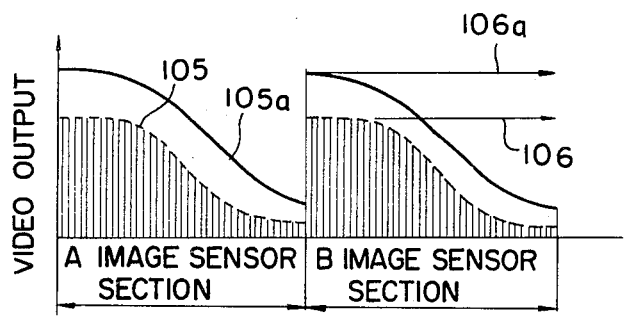

It will be seen that where the focus effective region limiting level 88 is fixed, the false focus indication signal appears when the contrast signal level is high. According to the invention, the focus effective region limiting level 88 is increased when the level of the contrast signals $C_{A1}$ and $C_B$ is increased, thus preventing the generation of the false focus indication signal. In other words, in this variable focus effective region limiting level setting system, the focus effective region limiting level is determined in proportion to the peak of the video output. When the video output is increased from the level 105 to the level 105a as shown in FIG. 37, the contrast signal level is also increased, and also the peak of the video output from the B image sensor section is also increased from a value 106 to a value 106a. If the focus effective region limiting level 88 is changed in proportion to the change of the peak of the B image sensor section, the focus effective region limiting level is such as shown at 107 and 108 in FIGS. 38(a) and 38(b), and focus effective regions 107(a) and 108(a) are obtained, so that focus indication signals as shown in FIGS. 38(d) and 38(h) are obtained.

As has been shown, in the variable focus effective region limiting level setting system, the generation of the false focus display can be prevented. While the examples of FIGS. 38(a) and 38(e) makes use of the peak of the video output of the B image sensor section, the same effects may also be obtained with the peak of the video output of the A image sensor section or with the average of the two peaks. Although even with the fixed focus effective region limiting level setting system the false focus display can be prevented by increasing the level, in this case the focus detection cannot be obtained with a low contrast image of an object. With the variable focus effective region limiting level setting system according to the invention, the focus detection is possible even with a low contrast image of an object, while the false focus display can be prevented.

Figure 39:
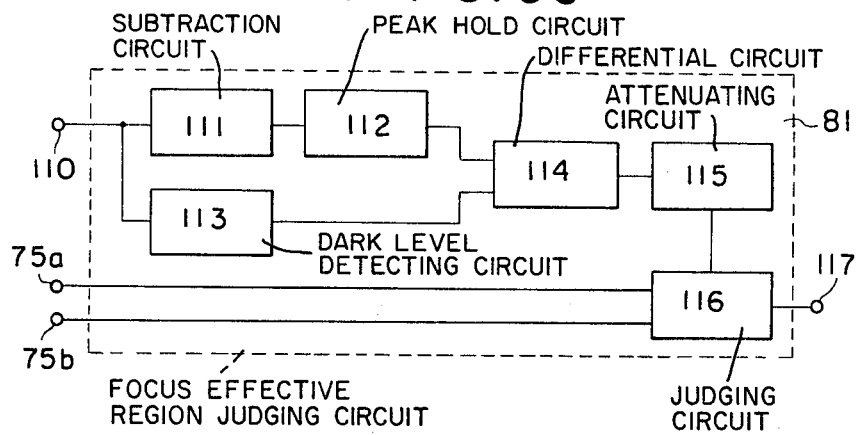
FIG. 39 is a block diagram of the focus effective region judging circuit 81 of the present invention.

FIG. 39 shows an example of the circuit construction of the focus effective region judging circuit 81, to which the variable effective region limiting level setting system described above is applied. In the Figure, designated at 110 is a video signal input terminal, at 111 a subtraction circuit, at 112 a peak hold circuit, at 113 a dark level detecting circuit, at 114 a differential circuit, at 115 an attenuating circuit, and at 116 a judging circuit.

When video signal appears at the terminal 110, a constant level is subtracted from the video output in the subtraction circuit 111, and the peak of the video output is detected by the peak hold circuit 112. Meanwhile, the output of the mask sensor 35a which has been described in connection with FIG. 13 is detected by the dark level detecting circuit 113, and this mask sensor output and the aforementioned peak value are coupled to the differential circuit 114. The difference output is coupled to the attenuating circuit 115 to produce a focus effective region limiting level. This focus effective region limiting level is compared with the contrast signals $C_A$ and $C_B$ coupled to terminals 75a and 75b in the judging circuit 116, whereby a signal representing the focus effective region is provided at a terminal 117.

Figure 40:
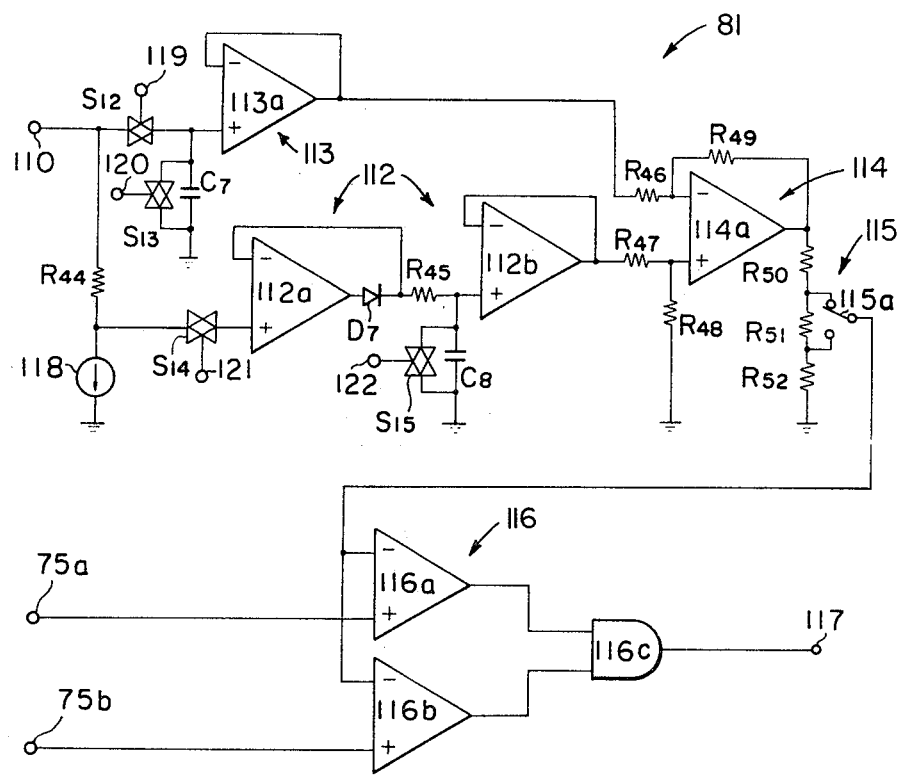
FIG. 40 is a schematic circuit diagram representing another example of the focus effective region judging circuit 81 of FIG. 39.
Figure 41:
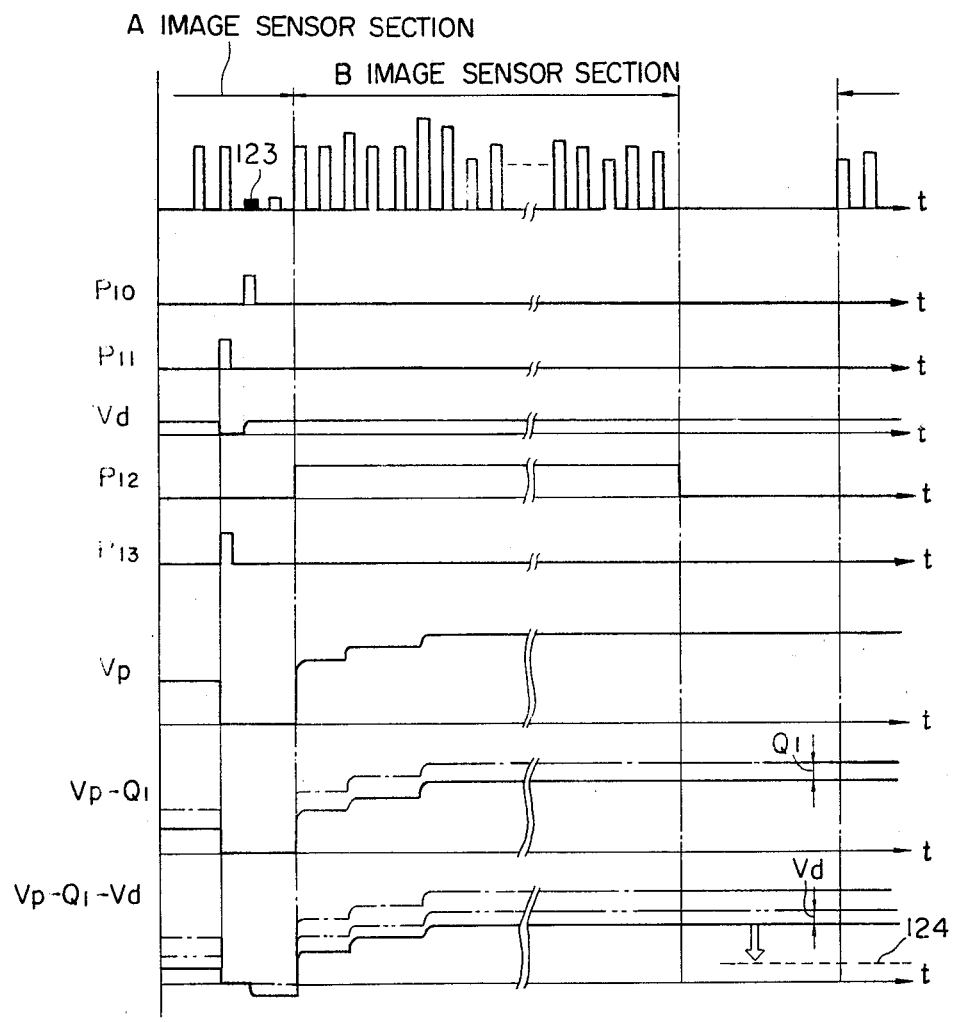
FIG. 41 is a wave form diagram illustrative of the process of extracting the focus effective region limiting level and the timing of generation of control pulses for the circuit of FIG. 40.

FIG. 40 show another specific example of the focus effective region judging circuit 81 shown in FIG. 39. Its operation will now be described together with its construction. FIG. 41 shows the process of extracting the focus effective region limiting level and the timing of generation of the control pulses supplied to analog switches $S_{12}$ to $S_{15}$ in the circuit of FIG. 40. The output 123 of the mask sensor 35a or 35b is extracted from the video output coupled to a terminal 110 through the analog switch $S_{12}$, to which a control signal $P_{10}$ is coupled with the timing as shown in FIG. 41, and capacitor $C_7$, and the sample and held output is coupled through an operational amplifier 113a serving as a buffer amplifier to one of input terminals of an operational amplifier 114a serving as a differential amplifier. The sampled and held output Vd corresponds to a dark level provided by the dark current in the image sensor $S_A$ and $S_B$. The charge stored in the capacitor $C_7$ is discharged by the analog switch $S_{13}$, to which the control pulse $P_{11}$ shown in FIG. 41 appearing at a terminal 120 is coupled, is discharged to obtain the reset state. Meanwhile, the constant level is subtracted from the aforementioned video output through a resistor $R_{44}$ and constant current source 118, and the peak of the video output in the B image sensor section $S_B$ is extracted through the analog switch $S_{14}$, to which the control pulse $P_{12}$ shown in FIG. 41 is coupled to a terminal 121, an amplifier 112, a diode $D_7$ and a capacitor $C_8$. The peak is coupled through an operational amplifier 112b serving as a buffer amplifier to the other terminal of the operational amplifier 114a. The charge stored in the capacitor $C_8$ is discharged through the analog switch $S_{15}$, to which the control pulse $P_{13}$ as shown in FIG. 41 coupled to a terminal 122, is discharged to the reset state. The difference output from the operational amplifier 114a is attenuated through resistors $R_{50}$ to $R_{52}$, thus providing the focus effective region limiting level. The switch 115a is provided for switching the focus effective region limiting level to two levels, and it permits the selection of an adequate focus effective region limiting level in dependence upon the changes of the contrast signal distribution due to changes of the F value of lens or other causes. While in the circuit of FIG. 40 two selectable levels are provided, it is also possible to provide three or more selectable levels. The resistors $R_{50}$ to $R_{52}$ and switch 115a constitute the aforementioned variable focus effective region limiting level setting circuit. The focus effective region limiting level in this circuit is compared in a comparator 116a with the contrast signal $C_{A1}$ coupled to a terminal 75a, and it is also compared in a comparator 116b with the contrast signal $C_B$ coupled to a terminal 75b. An AND gate 116c provides a signal, which is changed to a high level when both the contrast signals $C_{A1}$ and $C_B$ is higher than the aforementioned focus effective region limiting level, to output terminal 117.

The waveform of signal labeled Vp-$Q_1$ in FIG. 41 is that of the output of the operational amplifier 112b, and it corresponds to the result of subtracting a constant quantity $Q_1$ from the peak hold waveform Vp of the video output. The waveform labeled Vp-$Q_1$-$V_d$ is that of the operational amplifier 114a, and it is obtained by subtracting the dark level (output level of the mask sensor) $V_d$ from the waveform Vp-$Q_1$. By subtracting the dark level $V_d$ in this way, the increase of the peak value resulting from the extension of the change storage time or increase of the dark level due to temperature changes can be compensated for, and a proper focus effective region limiting level 124 free from the influence of charges of the brightness of the object or ambient temperature changes can be obtained. The subtraction of the constant quantity $Q_1$ is not always necessary, and the same effects may be obtained so long as the focus effective region limiting level is proportional to the peak of the video output.

Figure 42:
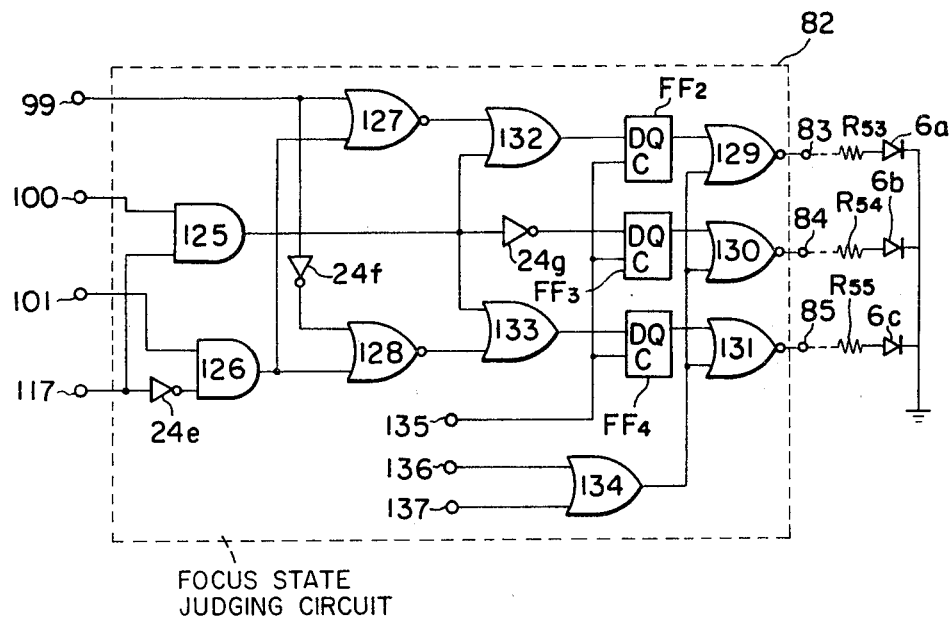
FIG. 42 is a logic block diagram of a specific example of the focus state judging circuit 82 of FIG. 33.
Figure 43:
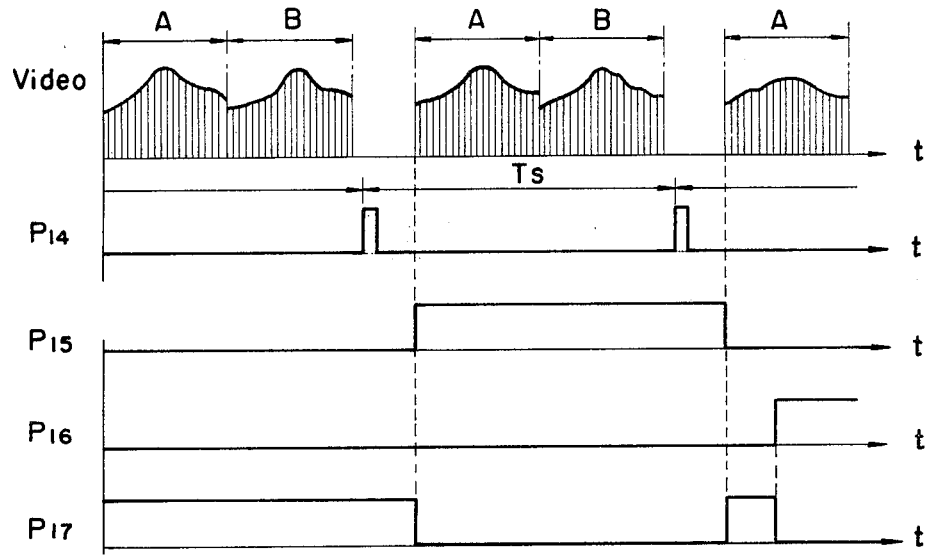
FIG. 43 depicts control pulses used in the focus state judging circuit 82 of FIG. 42.
Figure 44:
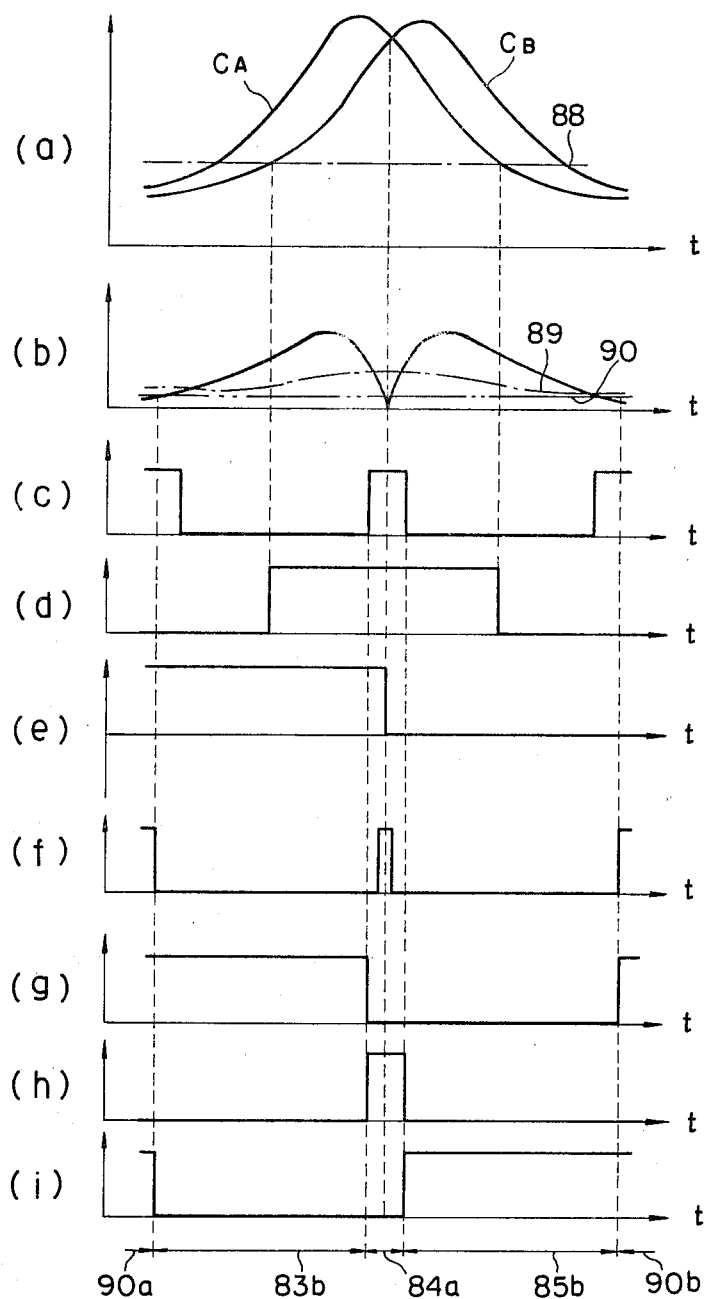
FIGS. 44(a)-(i) depicts control pulses used in the focus state judging circuit 82 of FIG. 42.

FIG. 42 shows a specific example of the focus state judging circuit 82 shown in FIG. 33. FIG. 43 shows control pulses used in the focus state judging circuit 82. FIG. 44 shows input signal to and output indication signal from the focus state judging circuit 82. The output signal of the direction detecting circuit 79 as shown in FIG. 44(e) is coupled to a terminal 99, the output signal of the focus detecting circuit 78 as shown in FIG. 44(c) is coupled to a terminal 100, the output signal of the NG detecting circuit 80 as shown in FIG. 44(f) is coupled to a terminal 101, and the output signal of the focus effective region judging circuit 81 as shown in FIG. 44(d) is coupled to a terminal 117. These input signals are logically processed through AND gates 125 and 126, NOR gates 127 and 128, OR gates 132 and 133 and inverters 24e to 24g, and three different signals are obtained at the Q terminal D flip-flops $FF_2$ to $FF_4$. A control signal $P_{15}$ as shown in FIG. 43 which appears at a terminal 135 is coupled to the clock terminal C of these D flip-flops.

Thus, these three signals are held for one scanning cycle period when they are once processed. For this reason, steady indication signal can be obtained. The Q output terminal of these D flip-flops $FF_2$ to $FF_4$ is connected to one of two input terminals of respective NOR gates 129 to 131, which are in turn connected at their output side to a pre-focus indication signal output terminal 83, a focus indication signal output terminal 84 and a post-focus indication signal output terminal 85. Although not shown in FIG. 42, the three output terminals 83 to 85 mentioned above are connected through the display drive circuit $U_5$ to the light-emitting diodes 6a to 6c constituting the focus display element and also to the drive unit $U_6$ as shown in FIG. 3.

Two terminals 136 and 137 are connected to an OR gate 134, the output side of which is commonly connected to the other input terminal of the aforementioned NOR gates 129 to 131, and the light-emitting diodes 6a to 6c are driven for display only when the input signals to the input terminals 136 and 137 are simultaneously at a low level.

A digital signal $P_{15}$ which is switched for one scanning period as shown in FIG. 43, is supplied to one of the aforementioned two terminals, namely the terminal 136, to render the light-emitting diodes 6a to 6c into a blinking state.

With this arrangement, blinking at a frequency proportional to the brightness of the object can be realized, and it can be used as an alarm for the case when the brightness is reduced, at which time the blinking frequency is also reduced. A digital signal $P_{16}$ which is changed to a high level at the time camera shutter release is supplied to the other terminal 137 for the purpose of preventing adverse effects of the light from the light-emitting diodes 6a to 6c for the focus display at the time of the camera shutter release upon the measurement of light for the exposure control. The terminal 137 can thus be omitted if other means for preventing the adverse effects upon the measurement of light is provided.

A signal $P_{17}$ shown in FIG. 43 represents the "on" period of the light-emitting diodes 6a to 6c.

With this focus state judging circuit 82, signals as shown in FIGS. 44(h) to 44(i) coupled to the respective light-emitting diodes 6a to 6c. Thus, the light-emitting diode 6b is held on in the focus display region, the light-emitting diode 6a held on in the pre-focus state, and the light-emitting diode 6e is held on in the post-focus state. Further, all the diodes 6a to 6c are simultaneously held on in the detection incapability state.

Simultaneously with the aforementioned display operation of the light-emitting diodes 6a to 6c, the lens drive unit $U_6$ is controlled by the pre-focus or post-focus indication signal as mentioned above to control the magnitude of extention of lens 2, whereby automatic focusing can be obtained.

While the foregoing description in connection with FIG. 3 and following Figures has concerned with an automatic focus detecting device in which two self-scanning type photoelectric converting devices are provided at positions equivalent to the position of the image plane of the lens system, the invention is applicable not only to such an automatic focus detecting device provided with two self-scanning type photoelectric converting devices, but it can also be applied to an automatic focus detecting device using a single self-scanning type photoelectric converting device.

With the automatic camera focus detecting device as has been described according to the invention, which comprises a self-scanning type photoelectric converting device provided at a position equivalent to the position of the image plane of the lens system and including a plurality of charge storage type microphotoelectic elements and a scanning circuit corresponding to the microphotoelectric element row for detecting the static of focus from the photoelectric output of the self-scanning type photoelectric converting device, and in which a light detector for monitoring constituted by a charge storage type photoelectric converting element is provided near and in the same plane as the photoelectric element row for permitting the control of the charge storage time of the self-scanning type photoelectric converting device according to the quantity of charge stored in the light detector in correspondence to the quantity of incident light, the following excellent effects can be obtained.

In the first place, it is possible to always obtain accurate and stable focus indication can be obtained irrespective of changes of the average brightness of the image of the object. That is, highly precise focus indication can be obtained even where there is a swing or the object is being moved. When the focus state is displayed with a light-emitting diode, steady display state of light free from flickering can be obtained.

Secondly, since the device of the commonly termed TTL type effecting the focus detection using light transmitted through the photographing lens system, it is possible to provide a practical automatic focus detecting device that is suited to a single lens reflex cameras and television cameras.

Further, since the light detector for monitoring uses a charge storage type photoelectric element for detecting the quantity of charge stored in corresponding to the quantity of incident light (i.e., time integral of the light flux), it is possible to reduce the area of the light detector and disposed this light detector in the close proximity of the photoelectric element row of the self-scanning type photoelectric converter which is monitored. Thus, it is possible to control the charge storage time of the self-scanning type photoelectric converting device with a still higher precision and further reduce the size of the IC chip in which the photoelectric element for the light detection is assembled, so that an automatic focus detecting device which is extremely suitable for use with a small-size single lens reflex camera can be obtained.

Further, the afore-described embodiments have the following effects in addition to the aforementioned common effects.

Where the repetition frequency of the scanning pulse series signal for the self-scanning photoelectric converting device is made constant, the pulse width of each pulse signal in the sequential photoelectric output can be made constant, so that the construction of the following stage photoelectric output extraction circuit can be simplified.

In the case of the arrangement that no start pulse is provided even with the appearing of a timing pulse during the presence of the scanning pulse series signal, the photoelectric output is taken out through the scanning of a predetermined number of microphotoelectric elements in the self-scanning type photoelectric converting device, so that it is possible to further stabilize the level of the photoelectric output and obtain further accurate and stable focus indication with respect to changes of the average brightness of the image of the object.

Further, where two self-scanning type photoelectric converting devices are provided together with corresponding two light detectors for monitoring for controlling the charge storage time of the self-scanning type photoelectric converting devices with the sum of the outputs of the two light detectors, accurate focus indication can be obtained even in case where there is a great difference between the quantities of light at two spaced-apart positions.

Further, since sequential photoelectric outputs which are proportional to light intensity distributions of object images at two positions on the optical axis on the opposite sides of the film equivalent plane are obtained using self-scanning photoelectric elements, photoelectric output differences between microphotoelectric elements for the individual object images are independently detected from the sequential photoelectric outputs to obtain two contrast signals and the focus indication is provided when the absolute values of the difference of the two contrast signals is lower than a predetermined focus detection threshold value proportional to the sum of the two contrast signals, the focus indication range is fixed irrespective of changes of the contrast of the image of the object, so that it is possible to obtain highly precise focus detection irrespective of the contrast of the image of the object. Further, since the focus indication range is substantially proportional to the lens diameter ratio like the focus depth of the lens, stable detection or display can be obtained to permit a picture image having sufficiently high clarity in practice even in case when the influence of the swing is great such as when using a telescopic lens.

Further, since sequential photoelectric conversion signals proportional to the light intensity distributions of object images at two positions before and after and at an equal distance from the position equivalent to the image plane of the lens system are provided from the respective self-scanning type photoelectric converting devices, the peak values of the photoelectric output differences between two microphotoelectric elements spaced apart a fixed distance in the individual self-scanning type photoelectric converting devices in one scanning period are provided as two time sequential contrast signals in correspondance to the magnitude of the lens extension, a predetermined effective region limiting level and the levels of the two contrast signals are compared in the focus effective region judging circuit and the focus indication signal obtained from the two contrast signals is provided with the levels of the two contrast signals are simultaneously higher than the effective region limiting level, the generation of a faluse focus indication signal in the out-of-focus state can be prevented to permit accurate focus indication.

Further, where a mask sensor is provided in part of the photoelectric element row for setting the predetermined effective region limiting level from a value obtained by subtracting the output level of the mask sensor from the peak of the sequential photoelectric output, accurate focus display can be obtained while maintaining sufficient focus detecting function even in special circumstances such as those a low brightness object or increased ambient temperatures.

Further, where a variable focus effective region limiting level setting circuit which permits the setting of a desired focus effective region limiting level, the false focus display can be reliably prevented to permit precise focus display to be always obtained even in case when the contrast of the image of the object is extremely high.

Further, with the construction according to the invention, which comprises two self-scanning type photoelectric converting devices disposed at positions before and after and at an equal distance from a position equivalent to the image plane of the lens system and each including a plurality of microphotoelectric elements and a scanning circuit for the microphotoelectric element row, a light splitter for splitting the incident light flux into two light fluxes with a half reflection mirror and projecting the two light fluxes onto the respective self-scanning type photoelectric converting devices, a contrast detecting circuit for providing the peaks of the photoelectric output differences between two microphotoelectric elements spaced apart a fixed distance in the individual self-scanning type photoelectric converting devices in one scanning period as two time sequential contrast signals and a contrast compensation circuit for compensating the two contrast signal for the out-of-balance therebetween due to the difference in the light transmittance between the two light paths of the two light fluxes in the light splitter by increasing or reducing one of the two contrast signals relative to the other, and in which the state of focus is detected from the two contrast signals after the compensation, only a single amplifier or attenuator is required for the contrast signal compensation, thus giving rise to no out-of-balance in circuitry and permitting the focus indication to be obtained with a still higher precision.

In addition to the above common effects, with the embodiment of the invention in which two self-scanning type photoelectric converting devices are serially scanned, only a single video output amplifier is required. Since in this case the contrast compensation circuit need not compensate for even the out-of-balance of the amplification degree or the like between video output amplifiers that may each be provided for each of the two self-scanning type photoelectric converting devices, and the adjustment of the contrast compensation circuit can be readily made.

We claim:

1. An automatic focus detecting device for a camera, said automatic focus detecting device having a light path along which light corresponding to an image of an object is transmitted and is incident, said device comprising:
   lens means having an image plane for focusing said light transmitted along said light path;
   at least one self-scanning type photoelectric converting device including a plurality of charge storage type microphotoelectric elements disposed in a microphotoelectric element array at a position optically corresponding to the image plane of said lens means, and scanning means for said microphotoelectric element array for detecting the state of focus of the image of the object to generate a photoelectric output of said at least one self-scanning type photoelectric converting device; and
   at least one light detector for monitoring said incident light, which integrates the quantity of light incident upon said microphotoelectric element array and is provided adjacent thereto, so that a position optically corresponding to that of said photographic film surface is retained, and in the same plane as said microphotoelectric element array for storing a quantity of charge in correspondence to the quantity of incident light, said at least one self-scanning type photoelectric converting device having a charge storage time which is controlled according to the quantity of charge stored in said charge storage type photoelectric element of said at least one light detector in correspondence to the quantity of incident light.

2. The automatic focus detecting device according to claim 1, wherein the charge storage time of said at least one self-scanning type photoelectric converting device is set equal to the period until the quantity of charge stored in said light detector reaches a predetermined threshold level.

3. The automatic focus detecting device according to claim 2, which further comprises a drive circuit connected to said self-scanning type photoelectric converting device, and started by a timing pulse generated upon reaching of said predetermined threshold level by the quantity of charge stored in said light detector to provide a single start pulse for driving said at least one self-scanning type photoelectric converting device and to provide a scanning pulse series signal at a constant repetition frequency, the charge storage time of said at least one self-scanning type photoelectric converting device being set equal to the time interval between two consecutive start pulses of said drive circuit.

4. The automatic focus detecting device according to claim 3, wherein a start pulse is not allowed to be provided, even if a timing pulse is provided, so long as the scanning pulse series signal prevails.

5. The automatic focus detecting device according to any one of claims 1, 2, 3 or 4, wherein said at least one self-scanning type photoelectric converting device comprises two self-scanning type photoelectric converting devices with their respective microphotoelectric element rows provided at positions before and after, and at an equal distance from, a position equivalent to the image plane of the lens means, and wherein said at least one light detector comprises two light detectors for monitoring, one for each of said microphotoelectric element rows, and wherein the charge storage time in said two self-scanning type photoelectric converting devices is controlled according to the sum of the quantities of charge stored in said two light detectors.

6. An automatic focus detecting device for a camera, said automatic focus detecting device having a light path along which light corresponding to an image of an object is transmitted and is incident, said device comprising:

lens means having an image plane for focusing said light transmitted along said light path, said lens means being characterized by a lens extension;

two self-scanning type photoelectric converting devices provided at positions before and after, and at an equal distance from, a position optically equivalent to the image plane of said lens means and each including a plurality of microphotoelectric elements disposed in a microphotoelectric element array, and scanning means for said microphotoelectric element array for providing a sequential photoelectric signal corresponding to the light intensity distribution of the image of said object;

contrast detecting means connected to said two self-scanning type photoelectric converting devices for providing the peak values of photoelectric output differences between two of said microphotoelectric elements in each of said two self-scanning type photoelectric converting devices, said two of said microphotoelectric elements in each of said two self-scanning type photoelectric converting devices being spaced apart a fixed distance in said respective ones of said two self-scanning type photoelectric converting devices, said peak values being derived in each scanning cycle period as two time-sequential contrast signals, each corresponding to scanning of a respective one of said two self-scanning type photoelectric converting devices, said two time-sequential contrast signals corresponding to the magnitude of said lens extension, so as to derive a focus zone having proper width;

and focus judging means connected to said contrast detecting means for providing a focus indication signal when the absolute value of the difference between said two time-sequential contrast signals is lower than a predetermined focus detection threshold level proportional to the sum of said two time-sequential contrast signals.

7. The automatic focus detecting device according to claim 6, wherein said focus judging means includes a direction detecting circuit for providing a signal which represents a pre-focus or post-focus state, depending upon whether the difference between said two time-sequential contrast signals is positive or negative, when the focus indication signal is not provided by said focus judging means.

8. The automatic focus detecting device according to any one or claims 6 or 7, wherein said focus judging means includes an incapability detecting circuit for providing a focus detection incapability indication signal when the absolute value of the difference between the two time-sequential contrast signals is lower than a constant focus detection incapability level.

9. The automatic focus detecting device according to claim 7, wherein said focus judging means provides a signal selectively indicating a pre-focus and post-focus state when said focus detection incapability indication signal is not provided.

10. The automatic focus detecting device according to any one of claims 6, 7 or 9, wherein said focus judging means includes a variable attenuation circuit for switching the focus detection threshold to one of two or more predetermined levels.

11. An automatic focus detecting device for a camera, said automatic focus detecting device having a light path along which light corresponding to an image of an object is transmitted and is incident, said device comprising:

lens means having an image plane for focusing said light transmitted along said light path, said lens means being characterized by a lens extension;

two self-scanning type photoelectric converting devices provided at positions before and after, and at an equal distance from, a position optically equivalent to the image plane of said lens means, and each including a plurality of microphotoelectric elements disposed in a microphotoelectric element array, and scanning means for said microphotoelectric element array for providing a sequential photoelectric signal corresponding to the light intensity distribution of the image of the object;

contrast detecting means connected to said two self-scanning type photoelectric converting devices for providing the peak values of photoelectric output differences between two of said microphotoelectric elements, spaced apart a fixed distance in respective ones of said two self-scanning type photoelectric converting devices, in one scanning cycle period as two time sequential contrast signals corresponding to the magnitude of said lens extension;

focus effective region judging means connected to said contrast detecting means for comparing the levels of said two contrast signals with a predetermeind focus effective region limiting level proportional to the peak of said sequential photoelectric signal; and focus indication means for providing a focus indication signal when the levels of said two contrast signals are simultaneously higher than said focus effective region limiting level.

12. The automatic focus detecting device according to claim 11, wherein said microphotoelectric element rows are each provided with a mask sensor having an output level and provided with a light blocking mask, said predetermined effective region limiting level being set to a value obtained by subtracting the output level of said mask sensor from the peak value of said sequential photoelectric signal.

13. The automatic focus detecting device according to any one of claims 11 or 12, wherein said focus effective region judging means includes a variable setting circuit for permitting the setting of the focus effective region limiting level to a desired level.

14. An automatic focus detecting device for a camera, said automatic focus detecting device having a light path along with light corresponding to an image of an object is transmitted and is incident, said device comprising:

lens means having an image plane for focusing said light transmitted along said light path;

two self-scanning type photoelectric converting devices provided at positions before and after, and at an equal distance from, a position optically equivalent to the image plane of the lens means, and each including a plurality of microphotoelectric elements disposed in a microphotoelectric element array, and a scanning circuit for said microphotoelectric element array;

light splitter means for splitting the incident light flux into two fluxes with a half mirror, and for projecting the resultant two light fluxes onto respective ones of said two self-scanning type photoelectric converting devices;

contrast detecting means connected to said two self-scanning type photoelectric devices for providing peak values of photoelectric output differences between two microphotoelectric elements, spaced apart a fixed distance in respective ones of said self-scanning type photoelectric converting devices, in one scanning period as two time sequential contrast signals corresponding to the magnstude of said lens extension of said lens means; and contrast compensation means connected to said contrast detecting means for compensating said two contrast signals for an out-of-balance condition therebetween due to the difference in the light transmittances between the light paths of the two light fluxes provided by said light splitter means by selectively increasing or reducing one of said two contrast signals with respect to the other;

wherein the state of focus is detected from said two contrast signals after the compensation.

15. An automatic focus detecting device for a camera, said automatic focus detecting device having a light path along which light corresponding to an image of an object is transmitted and is incident, said device comprising:

lens means having an image plane for focusing said light transmitted along said light path;

self-scanning photoelectric converting means connected to said lens means for detecting the state of focus of the image of the object, and having a charge storage time for storing a charge; and light detector means for monitoring said incident light and integrating the quantity of light incident upon said self-scanning photoelectric converting means, said light detector means having a charge storage type photoelectric element for storing a quantity of charge in correspondence to the quantity of incident light and including means controlling said charge storage time of said self-scanning photoelectric converting means in accordance with the quantity of charge stored in said charge storage type photoelectric element in correspondence to the quantity of said incident light.

16. An automatic focus detecting device for a camera, said automatic focus detecting device having a light path along which light corresponding to an image of an object is transmitted and is incident, said device comprising:

lens means having an image plane for focusing said light transmitted along said light path, said lens means being characterized by a lens extension;

self-scanning photoelectric converting means connected to said lens means for detecting the state of focus of the image of the object, and having a charge storage time for storing a charge, and providing at least two photoelectric signals corresponding to the light intensity distribution of the image of said object;

contrast detecting means connected to said self-scanning photoelectric converting means for deriving peak values of photoelectric output differences between two of said at least two photoelectric signals in one scanning cycle, so as to provide time-sequential contrast signals corresponding to the magnitude of said lens extension;

focus effective region judging means for comparing levels of said two contrast signals with a predetermined focus effective region limiting level proportional to the peak of said at least two photoelectric signals; and focus indication means for providing a focus indication signal when the levels of said two contrast signals are simultaneously higher than said focus effective region limiting level.

17. An automatic focus detecting device for a camera, said automatic focus detecting device having a light path along which light corresponding to an image of an object is transmitted and is incident, said device comprising:

lens means having an image plane for focusing said light transmitted along said light path;

self-scanning photoelectric converting means for detecting the state of focus of the image of the object, and having a charge storage time for storing a charge, and providing at least two photoelectric signals corresponding to the light intensity distribution of the image of said object;

light splitter means for splitting the incident light flux into two fluxes, and for providing the resultant two light fluxes to said self-scanning photoelectric converting means;

contrast detecting means connected to said self-scanning photoelectric converting means for providing peak values of photoelectric output differences between two of said at least two photoelectric signals in one scanning period, to provide time-sequential contrast signals corresponding to the magnitude of said lens extension; and contrast compensation means connected to said contrast detecting means for compensating said two contrast signals for an out-of-balance condition therebetween due to the difference in light transmittances between the light paths of the two light fluxes provided by said light splitter means.

18. The automatic focus detecting device according to claim 6, wherein said contrast detecting means samples the sequential photoelectric signal provided by said scanning means of said two self-scanning type photoelectric converting devices, said contrast detecting means including a first sampling circuit for sampling the sequential photoelectric signal at first and second times having a time interval therebetween corresponding to a first pair of microphotoelectric elements, a second sampling circuit for sampling the sequential photoelectric signal at third and fourth times having a time interval therebetween corresponding to a second pair of microphotoelectric elements, first and second difference circuits for deriving the difference between said samples at said first and second times, and said samples at said third and fourth times, respectively, to derive corresponding first and second difference outputs, a switch circuit for alternately selecting said first and second difference outputs to provide a signal sequential signal comprising a synthesized difference output, an absolute value circuit for obtaining the absolute value of the synthesized difference output to provide an absolute value signal, a second switch for separating portions of the absolute value signal corresponding to a first one of the self-scanning type photoelectric converting devices from those corresponding to a second one of the self-scanning type photoelectric converting devices, and individual peak detecting circuits for detecting the peak values of the respective portions of the absolute value signal.

* * * * *